US012429789B2

(12) United States Patent
Yoshiba et al.

(10) Patent No.: US 12,429,789 B2
(45) Date of Patent: Sep. 30, 2025

(54) TONER AND METHOD FOR PRODUCING TONER

(71) Applicant: CANON KABUSHIKI KAISHA, Tokyo (JP)

(72) Inventors: Daisuke Yoshiba, Shizuoka (JP); Tsuneyoshi Tominaga, Shizuoka (JP); Takashi Matsui, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 609 days.

(21) Appl. No.: 17/819,385

(22) Filed: Aug. 12, 2022

(65) Prior Publication Data

US 2023/0065610 A1 Mar. 2, 2023

(30) Foreign Application Priority Data

Aug. 19, 2021 (JP) ................................ 2021-134035

(51) Int. Cl.
*G03G 9/087* (2006.01)
*G03G 9/08* (2006.01)
*G03G 9/097* (2006.01)

(52) U.S. Cl.
CPC ....... *G03G 9/08728* (2013.01); *G03G 9/0806* (2013.01); *G03G 9/08711* (2013.01); *G03G 9/08731* (2013.01); *G03G 9/09708* (2013.01)

(58) Field of Classification Search
CPC ............. G03G 9/08728; G03G 9/0806; G03G 9/08711; G03G 9/08731; G03G 9/09708
See application file for complete search history.

(56) References Cited

U.S. PATENT DOCUMENTS

| | | | |
|---|---|---|---|
| 7,544,455 | B2 | 6/2009 | Yoshiba et al. |
| 7,678,523 | B2 | 3/2010 | Hiroko et al. |
| 7,700,254 | B2 | 4/2010 | Moribe et al. |
| 7,842,446 | B2 | 11/2010 | Yanase et al. |
| 7,855,042 | B2 | 12/2010 | Kobori et al. |
| 7,923,190 | B2 | 4/2011 | Magome et al. |
| 8,372,573 | B2 | 2/2013 | Ayaki et al. |
| 8,383,313 | B2 | 2/2013 | Ayaki et al. |
| 8,426,091 | B2 | 4/2013 | Magome et al. |
| 8,426,094 | B2 | 4/2013 | Magome et al. |
| 8,551,680 | B2 | 10/2013 | Ayaki et al. |
| 8,614,044 | B2 | 12/2013 | Matsui et al. |
| 8,778,585 | B2 | 7/2014 | Matsui et al. |
| 8,841,054 | B2 | 9/2014 | Dojo et al. |
| 8,883,389 | B2 | 11/2014 | Matsui et al. |
| 9,097,997 | B2 | 8/2015 | Nomura et al. |
| 9,097,998 | B2 | 8/2015 | Yamazaki et al. |
| 9,128,400 | B2 | 9/2015 | Takahashi et al. |
| 9,201,323 | B2 | 12/2015 | Nishikawa et al. |
| 9,213,250 | B2 | 12/2015 | Nomura et al. |
| 9,217,943 | B2 | 12/2015 | Matsui et al. |
| 9,239,528 | B2 | 1/2016 | Hasegawa et al. |
| 9,250,548 | B2 | 2/2016 | Nomura et al. |
| 9,261,804 | B2 | 2/2016 | Yamazaki et al. |
| 9,304,422 | B2 | 4/2016 | Matsui et al. |
| 9,341,970 | B2 | 5/2016 | Yoshiba et al. |
| 9,348,246 | B2 | 5/2016 | Magome et al. |
| 9,354,545 | B2 | 5/2016 | Matsui et al. |
| 9,423,708 | B2 | 8/2016 | Tominaga et al. |
| 9,442,416 | B2 | 9/2016 | Magome et al. |
| 9,442,419 | B2 | 9/2016 | Wakabayashi et al. |
| 9,470,993 | B2 | 10/2016 | Nishikawa et al. |
| 9,606,462 | B2 | 3/2017 | Nomura et al. |
| 9,658,546 | B2 | 5/2017 | Tanaka et al. |
| 9,720,340 | B2 | 8/2017 | Tominaga et al. |
| 9,733,583 | B2 | 8/2017 | Kuroki et al. |
| 9,733,584 | B2 | 8/2017 | Masumoto et al. |
| 9,785,077 | B2 | 10/2017 | Abe et al. |
| 9,829,818 | B2 | 11/2017 | Yoshiba et al. |
| 9,829,820 | B2 | 11/2017 | Masumoto et al. |
| 9,857,707 | B2 | 1/2018 | Tsuda et al. |
| 9,897,932 | B2 | 2/2018 | Hotta et al. |
| 9,904,195 | B2 | 2/2018 | Matsui et al. |
| 9,921,501 | B2 | 3/2018 | Mochizuki et al. |
| 9,971,263 | B2 | 5/2018 | Fukudome et al. |
| 10,012,919 | B2 | 7/2018 | Matsui et al. |
| 10,101,683 | B2 | 10/2018 | Nishikawa et al. |
| 10,156,800 | B2 | 12/2018 | Tsuda et al. |
| 10,197,934 | B2 | 2/2019 | Matsui et al. |
| 10,241,430 | B2 | 3/2019 | Kimura et al. |
| 10,289,016 | B2 | 5/2019 | Fukudome et al. |
| 10,295,921 | B2 | 5/2019 | Ohmori et al. |
| 10,303,074 | B2 | 5/2019 | Yamawaki et al. |

(Continued)

FOREIGN PATENT DOCUMENTS

| | | | | |
|---|---|---|---|---|
| JP | 2014-130243 A | | 7/2014 | |
| JP | 2019-219641 A | * | 12/2019 | ............... G03G 9/08 |

OTHER PUBLICATIONS

Machine translation of Hashimoto et al (JP 2019-219641 A) (Year: 2025).*
Machine translation of JP 2019-219641 A, Hashimoto (Year: 2025).*

*Primary Examiner* — Peter L Vajda
*Assistant Examiner* — Grant Steven Seiler
(74) *Attorney, Agent, or Firm* — VENABLE LLP

(57) ABSTRACT

A toner comprising a toner particle comprising a binder resin, wherein the binder resin has a side-chain crystalline polymer B having a monomer unit A made of at least one polymerizable monomer A selected from the group consisting of (meth)acrylic acid esters having a linear alkyl group having 18 to 36 carbon atoms, and the toner particle comprises boric acid.

11 Claims, No Drawings

(56) References Cited

U.S. PATENT DOCUMENTS

| | | | |
|---|---|---|---|
| 10,429,757 | B2 | 10/2019 | Yoshida et al. |
| 10,503,090 | B2 | 12/2019 | Tominaga et al. |
| 10,545,422 | B2 | 1/2020 | Yamawaki et al. |
| 10,578,990 | B2 | 3/2020 | Tsuda et al. |
| 10,635,011 | B2 | 4/2020 | Umeda et al. |
| 10,656,545 | B2 | 5/2020 | Kamae et al. |
| 10,732,529 | B2 | 8/2020 | Yoshiba et al. |
| 10,732,530 | B2 | 8/2020 | Matsui et al. |
| 10,782,623 | B2 | 9/2020 | Yoshiba et al. |
| 10,845,721 | B2 | 11/2020 | Tanaka et al. |
| 10,859,931 | B2 | 12/2020 | Hashimoto et al. |
| 10,877,388 | B2 | 12/2020 | Aoki et al. |
| 10,877,389 | B2 | 12/2020 | Kamikura et al. |
| 10,942,463 | B2 | 3/2021 | Yoshiba et al. |
| 10,942,466 | B2 | 3/2021 | Tominaga et al. |
| 10,969,704 | B2 | 4/2021 | Kagawa et al. |
| 10,969,705 | B2 | 4/2021 | Shirayama et al. |
| 10,976,679 | B2 | 4/2021 | Tanaka et al. |
| 11,003,104 | B2 | 5/2021 | Katsura et al. |
| 11,003,105 | B2 | 5/2021 | Sato et al. |
| 11,099,493 | B2 | 8/2021 | Komiya et al. |
| 11,112,708 | B2 | 9/2021 | Uratani et al. |
| 11,112,709 | B2 | 9/2021 | Saeki et al. |
| 11,169,460 | B2 | 11/2021 | Kototani et al. |
| 11,181,844 | B2 | 11/2021 | Nagaoka et al. |
| 11,249,408 | B2 | 2/2022 | Tsuda et al. |
| 11,262,666 | B2 | 3/2022 | Yoshiba et al. |
| 11,287,758 | B2 | 3/2022 | Matsui et al. |
| 11,448,980 | B2 | 9/2022 | Matsui et al. |
| 2012/0040284 | A1* | 2/2012 | Hiraoka et al. .......... G03G 9/00 |
| 2020/0319570 | A1* | 10/2020 | Srinivasan et al. .... G03G 9/093 |
| 2022/0128916 | A1 | 4/2022 | Yoshida et al. |
| 2022/0171302 | A1 | 6/2022 | Sato et al. |
| 2022/0326633 | A1 | 10/2022 | Aoki et al. |
| 2022/0334507 | A1 | 10/2022 | Aoki et al. |
| 2022/0342329 | A1 | 10/2022 | Yamamoto et al. |
| 2023/0004099 | A1 | 1/2023 | Seino et al. |
| 2023/0051836 | A1 | 2/2023 | Tominaga et al. |

* cited by examiner

TONER AND METHOD FOR PRODUCING TONER

BACKGROUND OF THE INVENTION

Field of the Invention

The present disclosure relates to a toner suitably used for an electrophotographic method, an electrostatic recording method, and a toner jet recording method (hereinafter, may be simply referred to as "toner"), and to a method for producing the toner.

Description of the Related Art

In recent years, energy saving has been considered as a major technical problem in the field of electrophotographic equipment as well, and a significant reduction in the amount of heat required for fixing devices has been investigated. In particular, regarding toners, there is an increasing need for so-called "low-temperature fixability", which enables fixing with lower energy.

Lowering the glass transition temperature (Tg) of a binder resin in a toner is one of the methods for enabling fixing at a low temperature. However, since lowering Tg leads to lowering the heat-resistant storage stability of the toner, it is difficult to achieve both low-temperature fixability and heat-resistant storage stability of the toner with this method.

Therefore, in order to achieve both low-temperature fixability and heat-resistant storage stability of the toner, a method of using a resin having crystallinity (hereinafter also referred to as a crystalline resin) as a binder resin has been studied. Amorphous resins commonly used as binder resins for toners do not show clearly heat absorption peaks in differential scanning calorimetry (DSC) measurements, whereas a crystalline resin has a regularly arranged molecular chain, thereby revealing a heat absorption peak (melting point) in the DSC measurement. The crystalline resin has a property of hardly softening up to the melting point. In addition, the crystal melts rapidly at the melting point, and the melting is accompanied by a sharp drop in viscosity. For this reason, crystalline resins are attracting attention as materials that excel in a sharp melt property and have both low-temperature fixability and heat-resistant storage stability.

As the crystalline resin for toners, a vinyl-based crystalline resin is preferably used. Usually, a vinyl-based crystalline resin has a long-chain alkyl group as a side chain in a main chain skeleton, and the long-chain alkyl groups in the side chains crystallize with each other, whereby the resin exhibits crystallinity. Up to now, improvement of low-temperature fixability and heat-resistant storage stability by using a vinyl-based crystalline resin has been studied.

For example, Japanese Patent Application Publication No. 2014-130243 proposes a toner using as a core a crystalline vinyl resin obtained by copolymerizing a polymerizable monomer having a long-chain alkyl group and an amorphous polymerizable monomer. As a result, both low-temperature fixing property and heat-resistant storage property can be achieved.

SUMMARY OF THE INVENTION

In the toner described in Japanese Patent Application Publication No. 2014-130243, binder resins obtained by copolymerizing a polymerizable monomer having a long-chain alkyl group and an amorphous polymerizable monomer are used. These resins show favorable low-temperature fixability. Meanwhile, according to the studies by the present inventors, sufficient crystallinity sometimes cannot be obtained in a binder resin obtained by copolymerizing a polymerizable monomer having a long-chain alkyl group and an amorphous polymerizable monomer, and there is still room for improvement in storage stability in a high-temperature environment.

The present disclosure provides a toner with which both low-temperature fixability and heat-resistant storage stability can be achieved at a high level, and a method for producing the same.

The present disclosure relates to a toner comprising a toner particle comprising a binder resin, wherein the binder resin has a side-chain crystalline polymer B having a monomer unit A made of at least one polymerizable monomer A selected from the group consisting of (meth) acrylic acid esters having a linear alkyl group having 18 to 36 carbon atoms, and the toner particle comprises boric acid.

Further, the present disclosure relates to a method for producing a toner comprising a toner particle comprising a binder resin, wherein the method comprises following steps (1) to (3):

(1) a dispersion step of preparing a dispersion liquid of resin fine particles comprising the binder resin comprising at least a side-chain crystalline polymer B having a monomer unit A derived from at least one polymerizable monomer A selected from the group consisting of (meth)acrylic acid esters having a linear alkyl group having 18 to 36 carbon atoms;

(2) an aggregation step of mixing and aggregating at least the dispersion liquid of the resin fine particles to form aggregates; and (3) a fusion step of heating and fusing the aggregates, and boric acid is present in the dispersion liquid in at least one of the steps (1) to (3).

Further, the present disclosure relates to a method for producing a toner comprising a toner particle comprising a binder resin, wherein the method comprises following steps (1) to (3):

(1) a dispersion step of preparing a dispersion liquid of resin fine particles comprising the binder resin comprising at least a side-chain crystalline polymer B having a monomer unit A derived from at least one polymerizable monomer A selected from the group consisting of (meth)acrylic acid esters having a linear alkyl group having 18 to 36 carbon atoms;

(2) an aggregation step of mixing and aggregating at least the dispersion liquid of the resin fine particles to form aggregates; and (3) a fusion step of heating and fusing the aggregates, and borax is added to the dispersion liquid in at least one of the steps (1) to (3).

According to the present disclosure, it is possible to provide a toner for which both low-temperature fixability and heat-resistant storage stability can be achieved at a high level. Further features of the present invention will become apparent from the following description of exemplary embodiments.

DESCRIPTION OF THE EMBODIMENTS

In the present disclosure, the terms "from XX to YY" and "XX to YY", which indicate numerical ranges, mean numerical ranges that include the lower limits and upper limits that are the end points of the ranges. In cases where numerical ranges are indicated incrementally, upper limits and lower limits of the numerical ranges can be arbitrarily combined.

The (meth)acrylic acid ester means an acrylic acid ester and/or a methacrylic acid ester. The "monomer unit" refers to the reacted form of a monomeric substance in a polymer. For example, one carbon-carbon bond section in the main chain in which the vinyl-based monomer in the polymer is polymerized is regarded as one unit. The vinyl-based monomer can be represented by the following formula (Z).

(Z)

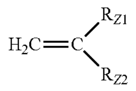

In the formula (Z), $R_{Z1}$ represents a hydrogen atom or an alkyl group (preferably an alkyl group having 1 to 3 carbon atoms, more preferably a methyl group), and $R_{Z2}$ represents an arbitrary substituent.

The crystalline resin refers to a resin that shows a clear endothermic peak in differential scanning calorimetry (DSC) measurement.

The present disclosure relates to a toner comprising a toner particle comprising a binder resin, wherein the binder resin has a side-chain crystalline polymer B having a monomer unit A made of at least one polymerizable monomer A selected from the group consisting of (meth) acrylic acid esters having a linear alkyl group having 18 to 36 carbon atoms, and the toner particle comprises boric acid.

As described above, in order to achieve both low-temperature fixability and heat-resistant storage stability of a toner, a method of using a resin having crystallinity as a binder resin has been studied, and it is preferable to use a side-chain crystalline resin as the crystalline resin. The side-chain crystalline resin is a resin having long-chain alkyl groups in the side chains with respect to a skeleton (main chain) of the organic structure, such resin having a structure capable of forming a crystalline structure between such side chains.

It is considered that main-chain crystalline resins represented by crystalline polyesters are crystallized by folding the main chain, whereas in the side-chain crystalline resins, the side chains are crystallized together. Therefore, the crystallization is possible in a very narrow region, and it is considered that the crystallinity is less likely to decrease due to the surrounding environment as compared with the main-chain crystalline resins. Therefore, it is conceivable that by using a side-chain crystalline resin as the binder resin, it is possible to obtain a toner having a better sharp melt property and also having both low-temperature fixability and heat-resistant storage stability.

As such a side-chain crystalline resin, a vinyl-based crystalline resin is preferably used. In the present disclosure, from the viewpoint of controlling the melting point and crystallinity, a side-chain crystalline polymer B having a monomer unit A made of at least one polymerizable monomer A selected from the group consisting of (meth)acrylic acid esters having a linear alkyl group having 18 to 36 carbon atoms is used.

However, even if a side-chain crystalline resin is used, the half-value width of the peak corresponding to the crystal component in differential scanning calorimetry (DSC) is likely to widen and the crystal component is likely to broaden, or the melting point is likely to lower under the effect of various temperature histories in the toner production process. Where the crystallization is insufficient, storage stability of the toner in a high-temperature environment is likely to decrease.

In order to solve these problems, the present inventors have investigated a toner configuration necessary to ensure both low-temperature fixability and heat-resistant storage stability at a high level in a toner using a side-chain crystalline resin. The present inventors have found that the above problems can be solved by including boric acid in a toner particle using the binder resin having the side-chain crystalline polymer B as described above, whereby the crystallinity of the side-chain crystalline resin is improved.

The reason why the crystallinity is improved by the addition of boric acid can be considered as follows. Boric acid is described as $B(OH)_3$ and has hydroxy groups. When boric acid is used in a side-chain crystalline resin, it is expected that the hydroxy groups of boric acid and the ester bond portion of the (meth)acrylic acid ester present in the monomer unit A portion of the crystalline resin loosely interact with each other. It is considered that, as a result, the orientation of the long-chain alkyl portion of the monomer unit A is promoted via boric acid, the crystallinity of the side-chain crystalline portion is improved, and low-temperature fixability and storage stability can be achieved at a high level.

These effects are obtained for the first time due to a copresence of boric acid and the binder resin having the side-chain crystalline polymer B and are difficult to obtain with other crystalline resins. The boric acid may be present in the toner particle in the state of unsubstituted boric acid and may be also used in the state of organic boric acid, a boric acid salt, a boric acid ester, or the like at the stage of using as a raw material.

In a case where the toner is produced in an aqueous medium, the boric acid is preferably added as a boric acid salt from the perspectives of reactivity and production stability, with specific examples thereof including sodium tetraborate and ammonium borate, and it is particularly preferable to use borax. Because borax is sodium tetraborate ($Na_2B_4O_7$) decahydrate and is converted into boric acid in acidic aqueous solutions, it is preferable to use borax in a case where the boric acid is used in an acidic environment in an aqueous medium.

Further, the amount of boric acid in the toner is preferably from 0.1% by mass to 10.0% by mass. Where the amount of boric acid is at least 0.1% by mass, the effect of promoting crystallinity is easily obtained, and where the amount of boric acid is not more than 10.0% by mass, the sharp melt property is improved by adequate crosslinking. The amount of boric acid in the toner is preferably from 0.5% by mass to 8.0% by mass, and more preferably from 0.8% by mass to 6.0% by mass.

The amount of the side-chain crystalline polymer B in the binder resin is preferably at least 50.0% by mass, more preferably at least 70.0% by mass, and still more preferably at least 80.0% by mass. When the amount is at least 50.0% by mass, the sharp melt property of the toner is easily maintained, and the low-temperature fixability is further improved. The upper limit is not particularly limited, but is preferably not more than 100.0% by mass.

The binder resin may include another resin in addition to the side-chain crystalline polymer B. Examples of the resin that can be used in addition to the polymer B as the binder resin include known vinyl-based resins, polyester resins, polyurethane resins, epoxy resins, and the like. Of these, vinyl-based resins, polyester resins, and polyurethane resins are preferable from the viewpoint of electrophotographic characteristics.

The side-chain crystalline polymer B preferably has a monomer unit A made of a polymerizable monomer A and a monomer unit C made of a polymerizable monomer C different from the polymerizable monomer A. By copolymerizing the polymerizable monomer C together with the polymerizable monomer A, the content ratio of alkyl groups can be lowered to not more than a certain level, and the elasticity at around room temperature can be further improved, so that durability is further improved.

Further, where the SP value of the monomer unit A is denoted by $SP_{11}$ $(J/cm^3)^{0.5}$ and the SP value of the monomer unit C is denoted by $SP_{21}$ $(J/cm^3)^{0.5}$, it is preferable that the following formula (1) be satisfied. Further, when the SP value of the polymerizable monomer A is denoted by $SP_{12}$ $(J/cm^3)^{0.5}$ and the SP value of the polymerizable monomer C is denoted by $SP_{22}$ $(J/cm^3)^{0.5}$, it is preferable that the following formula (2) be satisfied.

$$2.00 \leq (SP_{21} - SP_{11}) \leq 25.00 \quad (1)$$

$$0.50 \leq (SP_{22} - SP_{12}) \leq 15.00 \quad (2)$$

Here, the SP value is an abbreviation for the solubility parameter and is a value representing an index of solubility. The calculation method will be described hereinbelow. The units of the SP value are $(J/m^3)^{0.5}$, but conversion to units of $(cal/cm^3)^{0.5}$ is possible by 1 $(cal/cm^3)^{0.5} = 2.045 \times 10^3$ $(J/m^3)^{0.5}$.

By satisfying the above formula (1) or the formula (2), the melting point is likely to be maintained without lowering the crystallinity even when the polymerizable monomer A and the polymerizable monomer C are used in combination in the side-chain crystalline polymer B. As a result, it is easy to achieve both low-temperature fixability and durability at a higher level. The following mechanism thereof is suggested.

The monomer units A are incorporated into the side-chain crystalline polymer B (hereinafter, also referred to as "polymer B"), and the monomer units A are aggregated with each other to exhibit crystallinity. Normally, if another monomer unit is incorporated herein, crystallization is inhibited, so that it becomes difficult to develop crystallinity as a polymer. This tendency becomes remarkable when the monomer unit A and another monomer unit are randomly bonded in one molecule of the polymer.

Meanwhile, it is considered that by using polymerizable monomers for which $SP_{22} - SP_{12}$ is in the range of the above formula (2), the polymerizable monomer A and the polymerizable monomer C can be bonded to some extent continuously rather than randomly at the time of polymerization. It is considered that as a result, in the polymer B, the monomer units A are aggregated with each other and the crystallinity of the polymer can be improved even though other monomer units are incorporated, so that the melting point can be maintained. That is, the polymer B preferably has a crystalline segment including the monomer unit A derived from the polymerizable monomer A. Further, the polymer B preferably has an amorphous segment including a monomer unit C derived from the polymerizable monomer C.

Further, it is considered that when $SP_{21} - SP_{11}$ is in the range of the formula (1), a clear phase separation state can be formed in the polymer B without the monomer unit A and the monomer unit C being compatible with each other, and it is considered that the melting point can be maintained without lowering the crystallinity.

When $SP_{22} - SP_{12}$ is at least 0.50, the melting point of the polymer B is in a suitable range, and the heat-resistant storage stability is further improved. Further, when $SP_{22} - SP_{12}$ is not more than 15.00, the copolymerization ability of the polymer B is improved, and the low-temperature fixability is further improved. The lower limit of $SP_{22} - SP_{12}$ is more preferably at least 0.60, further preferably at least 2.00, and even more preferably at least 3.00. The upper limit is more preferably not more than 10.00, and further preferably not more than 7.00.

Similarly, when $SP_{21} - SP_{11}$ is at least 2.00, the melting point of the polymer B is in a suitable range, and the heat-resistant storage stability is further improved. Further, when $SP_{21} - SP_{11}$ is not more than 25.00, the copolymerization ability of the polymer B is improved, and the low-temperature fixability is further improved. The lower limit of $SP_{21} - SP_{11}$ is more preferably at least 3.00, further preferably at least 4.00, and even more preferably at least 5.00. Further, the upper limit is more preferably not more than 20.00, and further preferably not more than 15.00.

When there is a plurality of types of monomer units satisfying the requirements related to the monomer unit A in the polymer B, the value of $SP_{11}$ in the formula (1) is a weighted average of the SP values of the respective monomer units. For example, the SP value ($SP_{11}$) when a monomer unit $A^1$ having an SP value of $SP_{111}$ is contained in $A^1$ mol % based on the number of moles of all the monomer units satisfying the requirements related to the monomer unit A, and a monomer unit $A^2$ having an SP value of $SP_{12}$ is contained in $(100-A^1)$ mol % based on the number of moles of all the monomer units satisfying the requirements related to the monomer unit A is $$SP_{11} = (SP_{111} \times A^1 + SP_{112} \times (100 - A^1))/100.$$

The same calculation is performed when three or more monomer units satisfying the requirements related to the monomer unit A are included. Meanwhile, $SP_{12}$ likewise represents an average value calculated by the molar ratio of each polymerizable monomer A.

Regarding the monomer unit C made of the polymerizable monomer C, where there is only one type of the monomer unit C, the relationships of the formulas (1) and (2) are calculated with respect to the monomer unit C and the polymerizable monomer C. When there is a plurality of types of monomer units C, the relationships of the formulas (1) and (2) are calculated for each of the monomer units C and the polymerizable monomer C.

The content ratio of the monomer unit A in the polymer B is preferably 5.0 mol % to 79.0 mol %, more preferably 10.0 mol % to 60.0 mol %, and even more preferably 20.0 mol % to 40.0 mol % based on the total number of moles of all the monomer units in the polymer B.

The content ratio of the monomer unit A in the polymer B is preferably 15.0% by mass to 90.0% by mass, more preferably 35.0% by mass to 80.0% by mass, and even more preferably 50.0% by mass to 70.0% by mass.

The content ratio of the polymerizable monomer A in the polymerizable monomer composition for producing the polymer B is preferably 5.0 mol % to 79.0 mol %, more preferably 10.0 mol % to 60.0 mol %, and even more preferably 20.0 mol % to 40.0 mol % based on the total number of moles of all the polymerizable monomers in the composition.

Further, the content ratio of the polymerizable monomer A in the polymerizable monomer composition for producing the polymer B is preferably 15.0% by mass to 90.0% by mass, more preferably 35.0% by mass to 80.0% by mass, and even more preferably 50.0% by mass to 70.0% by mass.

The content ratio of the monomer unit C in the polymer B is preferably 20.0 mol % to 94.0 mol, more preferably 40.0 mol % to 85.0 mol %, and even more preferably 40.0 mol % to 70.0 mol % based on the total number of moles of all the monomer units in the polymer B.

The content ratio of the monomer unit C in the polymer B is preferably 8.0% by mass to 75.0% by mass, more preferably 15.0% by mass to 55.0% by mass, and even more preferably 20.0% by mass to 40.0% by mass.

The content ratio of the polymerizable monomer C in the polymerizable monomer composition for producing the polymer B is preferably 20.0 mol % to 94.0 mol %, more preferably 40.0 mol % to 85.0 mol %, and even more preferably 40.0 mol % to 70.0 mol % based on the total number of moles of all the polymerizable monomers in the composition.

Further, the content ratio of the polymerizable monomer C in the polymerizable monomer composition for producing the polymer B is preferably 8.0% by mass to 75.0% by mass, more preferably 15.0% by mass to 55.0% by mass, and even more preferably 20.0% by mass to 40.0% by mass.

When the content ratio of the monomer unit A in the polymer B and the content ratio of the polymerizable monomer A in the polymerizable monomer composition are within the above ranges, the polymer B exhibits a sharp melt property. At the same time, elasticity near room temperature is maintained. As a result, the toner becomes excellent in low-temperature fixability and durability.

When the content ratios of the monomer unit A and the polymerizable monomer A are at least 5.0 mol %, the amount of crystallization of the polymer B is large, the sharp melt property is improved, and the low-temperature fixability is improved. Meanwhile, when the content ratios are not more than 80.0 mol %, the elasticity near room temperature is sufficient, so that the durability of the toner is further improved.

When the content ratio of the monomer unit C in the polymer B and the content ratio of the polymerizable monomer C in the polymerizable monomer composition are within the above ranges, the elasticity of the polymer B near room temperature can be improved while maintaining the sharp melt property. As a result, the toner excels in low-temperature fixability and durability. In addition, the crystallization of the monomer unit A in the polymer B is unlikely to be inhibited and the melting point is likely to be maintained.

When the content ratios of the monomer unit C and the polymerizable monomer C are at least 20.0 mol %, the elasticity of the polymer B is sufficient, so that the durability of the toner is improved. Meanwhile, when the content ratios are not more than 95.0 mol %, the sharp melt property of the polymer B is improved and the low-temperature fixability is further improved.

When the polymer B has two or more kinds of monomer units A derived from (meth)acrylic acid esters having alkyl groups having 18 to 36 carbon atoms, the content ratio of the monomer units A represents the total molar ratio or mass ratio thereof. Further, when the polymerizable monomer composition used for the polymer B includes two or more kinds of (meth)acrylic acid esters having alkyl groups having 18 to 36 carbon atoms, the content ratio of the polymerizable monomers A likewise represents the total molar ratio or mass ratio thereof.

When there are two or more types of monomer units C derived from the polymerizable monomer C satisfying the formula (1) in the polymer B, the ratio of the monomer units C represents the total molar ratio or mass ratio thereof. Further, when the polymerizable monomer composition used for the polymer B includes two or more kinds of the polymerizable monomer C, the content ratio of the polymerizable monomers C likewise represents the total molar ratio or mass ratio thereof.

The polymer B preferably has a monomer unit A having a structure represented by the following formula (I). The polymer B has a crystalline segment derived from a long-chain alkyl group present in the monomer unit A. The monomer unit A (or C) is, for example, a monomer unit obtained by addition polymerization (vinyl polymerization) of the polymerizable monomer A (or C).

(I)

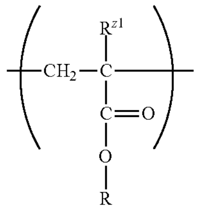

In the formula (I), $R^{Z1}$ represents a hydrogen atom or a methyl group, and R represents an alkyl group having 18 to 36 carbon atoms (preferably a linear alkyl group having 18 to 30 carbon atoms).

The polymerizable monomer A is at least one selected from the group consisting of (meth)acrylic acid esters having an alkyl group having 18 to 36 carbon atoms.

Examples of the (meth)acrylic acid ester having an alkyl group having 18 to 36 carbon atoms include a (meth)acrylic acid ester having a linear alkyl group having 18 to 36 carbon atoms [stearyl (meth)acrylate, nonadecyl (meth)acrylate, eicosyl (meth)acrylate, heneicosanyl (meth)acrylate, behenyl (meth)acrylate, lignoceryl (meth)acrylate, ceryl (meth) acrylate, octacosyl (meth)acrylate, myricyl (meth)acrylate, dotriacontyl (meth)acrylate, and the like] and a (meth) acrylic acid ester having a branched alkyl group having 18 to 36 carbon atoms [2-decyltetradecyl (meth)acrylate and the like].

Of these, from the viewpoint of toner storage stability, it is preferably at least one selected from the group consisting of (meth)acrylic acid esters having a linear alkyl group having 18 to 36 carbon atoms. More preferably, it is at least one selected from the group consisting of (meth)acrylic acid esters having a linear alkyl group having 18 to 30 carbon atoms. Even more preferably, it is at least one selected from the group consisting of linear stearyl (meth)acrylate and behenyl (meth)acrylate, and still more preferably it is at least one selected from the group consisting of linear behenyl (meth)acrylate.

The polymerizable monomer A may be used alone or in combination of two or more.

Examples of the polymerizable monomer C that forms the monomer unit C may include polymerizable monomers that satisfy formula (2) above among the polymerizable monomers listed below. The polymerizable monomer C may be a single monomer or a combination of two or more types.

A monomer having a nitrile group; for example, acrylonitrile and methacrylonitrile.

A monomer having a hydroxy group: for example, 2-hydroxyethyl (meth)acrylate, 2-hydroxypropyl (meth)acrylate, and the like.

A monomer having an amide group: for example, acrylamide and a monomer obtained by reacting an amine having from 1 to 30 carbon atoms and a carboxylic acid having an ethylenically unsaturated bond having from 2 to 30 carbon atoms (acrylic acid, methacrylic acid, and the like) by a known method.

A monomer having a urethane group: for example, a monomer obtained by reacting an alcohol having from 2 to 22 carbon atoms (2-hydroxyethyl methacrylate, vinyl alcohol, and the like) and an ethylenically unsaturated bond and an isocyanate having from 1 to 30 carbon atoms [a monoisocyanate compound (benzenesulfonyl isocyanate, tosyl isocyanate, phenyl isocyanate, p-chlorophenyl isocyanate, butyl isocyanate, hexyl isocyanate, t-butyl isocyanate, cyclohexyl isocyanate, octyl isocyanate, 2-ethylhexyl isocyanate, dodecyl isocyanate, adamantyl isocyanate, 2,6-dimethylphenyl isocyanate, 3,5-dimethylphenyl isocyanate, 2,6-dipropylphenylisocyanate, and the like), an aliphatic diisocyanate compound (trimethylene diisocyanate, tetramethylene diisocyanate, hexamethylene diisocyanate, pentamethylene diisocyanate, 1,2-propylene diisocyanate, 1,3-butylene diisocyanate, dodecamethylene diisocyanate, 2,4,4-trimethylhexamethylene diisocyanate, and the like), an alicyclic diisocyanate compound (1,3-cyclopentene diisocyanate, 1,3-cyclohexane diisocyanate, 1,4-cyclohexane diisocyanate, isophorone diisocyanate, hydrogenated diphenylmethane diisocyanate, hydrogenated xylylene diisocyanate, hydrogenated tolylene diisocyanate, hydrogenated tetramethylxylylene diisocyanate, and the like), and an aromatic diisocyanate compound (phenylene diisocyanate, 2,4-tolylene diisocyanate, 2,6-tolylene diisocyanate, 2,2'-diphenylmethane diisocyanate, 4,4'-diphenylmethane diisocyanate, 4,4'-toluidine diisocyanate, 4,4'-diphenyl ether diisocyanate, 4,4'-diphenyl diisocyanate, 1,5-naphthalene diisocyanate, xylylene diisocyanate, and the like)], and the like by a known method;

a monomer obtained by reacting an alcohol having from 1 to 26 carbon atoms (methanol, ethanol, propanol, isopropyl alcohol, butanol, t-butyl alcohol, pentanol, heptanol, octanol, 2-ethylhexanol, nonanol, decanol, undecyl alcohol, lauryl alcohol, dodecyl alcohol, myristyl alcohol, pentadecyl alcohol, cetanol, heptadecanol, stearyl alcohol, isostearyl alcohol, elaidyl alcohol, oleyl alcohol, linoleil alcohol, linolenyl alcohol, nonadecyl alcohol, heneicosanol, behenyl alcohol, erucyl alcohol, and the like) and an isocyanate having from 2 to 30 carbon atoms and an ethylenically unsaturated bond [2-isocyanatoethyl (meth)acrylate, 2-(0-[1'-methylpropylidenamino]carboxyamino])ethyl meth (acrylate), 2-[(3,5-dimethylpyrazolyl)carbonylamino]ethyl (meth)acrylate, 1,1-(bis(meth)acryloyloxymethyl)ethyl isocyanate, and the like] by a known method; and the like.

A monomer having a urea group; for example, a monomer obtained by reacting an amine having from 3 to 22 carbon atoms [primary amines (normal butylamine, t-butylamine, propylamine, isopropylamine, and the like), secondary amines (dinormalethylamine, dinormalpropylamine, dinormal butylamine, and the like), aniline, cyclohexylamine, and the like] with an isocyanate having from 2 to 30 carbon atoms and an ethylenically unsaturated bond by a known method.

A monomer having a carboxy group; for example, methacrylic acid, acrylic acid, and 2-carboxyethyl (meth)acrylate.

Among them, it is preferable to use a monomer having a nitrile group, an amide group, a urethane group, a hydroxy group, or a urea group. More preferably, the polymerizable monomer C is a monomer having an ethylenically unsaturated bond and at least one functional group selected from the group consisting of a nitrile group, an amide group, a hydroxy group, a urethane group, and a urea group.

By having these, the melting point of the polymer B is likely to rise, and the heat-resistant storage stability is likely to be improved. In addition, the elasticity near room temperature increases, and the durability is likely to improve.

As the polymerizable monomer C, vinyl esters such as vinyl acetate, vinyl propionate, vinyl butyrate, vinyl caproate, vinyl caprylate, vinyl caprate, vinyl laurate, vinyl myristate, vinyl palmitate, vinyl stearate, vinyl pivalate, and vinyl octylate are also preferably used.

Vinyl esters are non-conjugated monomers, and the reactivity thereof with the polymerizable monomer A can be easily maintained. It is considered that for this reason it becomes easy to form a state in which the monomer units derived from the polymerizable monomer A are aggregated and bonded in the polymer B, the crystallinity of the polymer B is enhanced, and both low-temperature fixability and heat-resistant storage property are likely to be achieved.

The polymerizable monomer C preferably has an ethylenically unsaturated bond, and more preferably has one ethylenically unsaturated bond.

Further, it is preferable that the polymerizable monomer C be at least one selected from the group consisting of the following formulas (A) and (B).

(A)

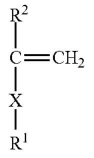

(B)

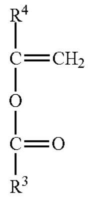

In the formula (A), X represents a single bond or an alkylene group having 1 to 6 carbon atoms.

$R^1$ is

—C≡N,

—C(═O)NHR$^{10}$ ($R^{10}$ represents a hydrogen atom or an alkyl group having 1 to 4 carbon atoms), a hydroxy group, —COOR$^{11}$ ($R^{11}$ represents a hydrogen atom, an alkyl group having 1 to 6 (preferably 1 to 4) carbon atoms, or a hydroxyalkyl group having 1 to 6 (preferably 1 to 4) carbon atoms), —NHCOOR$^{12}$ ($R^{12}$ represents an alkyl group having 1 to 4 carbon atoms), —NH—C(═O)—N($R^{13}$)$_2$ (the two $R^{13}$ independently represent a hydrogen atom or an alkyl group having 1 to 6 (preferably 1 to 4) carbon atoms), —COO($CH_2$)$_2$NHCOOR$^{14}$ ($R^{14}$ represents an alkyl group having 1 to 4 carbon atoms), or —COO($CH_2$)$_2$—NH—C(═O)—N($R^{15}$)$_2$ (the two $R^{15}$ independently represent a hydrogen atom or an alkyl group having 1 to 6 (preferably 1 to 4) carbon atoms). $R^2$ represents a hydrogen atom or a methyl group.

In the formula (B), $R^3$ represents an alkyl group having 1 to 4 carbon atoms.

$R^4$ represents a hydrogen atom or a methyl group.

The polymerizable monomer C is preferably at least one selected from the group consisting of acrylonitrile, methacrylonitrile and methyl methacrylate, and is more preferably at least one selected from the group consisting of acrylonitrile and methacrylonitrile.

The polymer B is preferably a vinyl polymer. The vinyl polymer can be exemplified by a polymer of a monomer including an ethylenically unsaturated bond. The ethylenically unsaturated bond refers to a carbon-carbon double bond capable of radical polymerization, and examples thereof include a vinyl group, a propenyl group, an acryloyl group, and a methacryloyl group.

The monomer unit C is preferably at least one selected from the group consisting of a monomer unit represented by the following formula (II) and a monomer unit represented by the following formula (III).

(II)

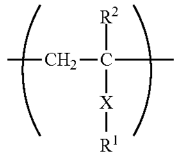

(III)

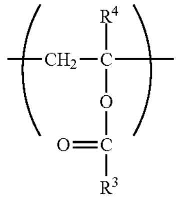

In the formula (II), X represents a single bond or an alkylene group having 1 to 6 carbon atoms.

$R^1$ is

—C≡N,

—C(=O)NHR$^{10}$ ($R^{10}$ represents a hydrogen atom or an alkyl group having 1 to 4 carbon atoms), a hydroxy group, —COOR$^{11}$ ($R^{11}$ represents a hydrogen atom, an alkyl group having 1 to 6 (preferably 1 to 4) carbon atoms, or a hydroxyalkyl group having 1 to 6 (preferably 1 to 4) carbon atoms), —NHCOOR$^{12}$ ($R^{12}$ represents an alkyl group having 1 to 4 carbon atoms), —NH—C(=O)—N($R^{13}$)$_2$ (the two $R^{13}$ independently represent a hydrogen atom or an alkyl group having 1 to 6 (preferably 1 to 4) carbon atoms), —COO($CH_2$)$_2$NHCOOR$^{14}$ ($R^{14}$ represents an alkyl group having 1 to 4 carbon atoms), or —COO($CH_2$)$_2$—NH—C(=O)—N($R^{15}$)$_2$ (the two $R^{15}$ independently represent a hydrogen atom or an alkyl group having 1 to 6 (preferably 1 to 4) carbon atoms). $R^2$ represents a hydrogen atom or a methyl group.

In the formula (III), $R^3$ represents an alkyl group having 1 to 4 carbon atoms.

$R^4$ represents a hydrogen atom or a methyl group.

In addition to the monomer unit A made of the polymerizable monomer A and the monomer unit C made of the polymerizable monomer C, the polymer B may include a monomer unit D made of a the polymerizable monomer D different from the polymerizable monomer A and the polymerizable monomer C.

Further, in addition to the polymerizable monomer A and the polymerizable monomer C, the polymerizable monomer composition forming the polymer B may include a polymerizable monomer D different from the polymerizable monomer A and the polymerizable monomer C.

As the polymerizable monomer D, among the monomers listed in the above section related to the polymerizable monomer C, a monomer that does not satisfy the formula (2) can be used.

Further, the following monomers having no nitrile group, amide group, urethane group, hydroxy group, urea group, or carboxy group can also be used.

For example, styrene and derivatives thereof such as styrene, o-methylstyrene, and the like, and (meth)acrylic acid esters such as methyl (meth)acrylate, n-butyl (meth) acrylate, t-butyl (meth)acrylate, and 2-ethylhexyl (meth) acrylate.

As the polymerizable monomer D, styrene is preferable from the viewpoint of ability to copolymerize with other monomers.

The content ratio of the monomer unit D in the polymer B is preferably 1.0 mol % to 25.0 mol %, and more preferably 10.0 mol % to 20.0 mol % based on the total number of moles of all the monomer units in the polymer B.

Further, the content ratio of the monomer unit D in the polymer B is preferably 1.0% by mass to 20.0% by mass, and more preferably 5.0% by mass to 15.0% by mass.

Further, the weight average molecular weight (Mw) of a tetrahydrofuran (THF) soluble fraction of the polymer B measured by gel permeation chromatography (GPC) is preferably 10,000 to 200,000, and more preferably 20,000 to 150,000. When the weight average molecular weight (Mw) is in the above range, elasticity near room temperature can be easily maintained.

Further, the melting point of the polymer B is preferably 50° C. to 80° C., and more preferably 53° C. to 70° C. When the melting point is in the above range, the low-temperature fixability and the heat-resistant storage stability are further improved. The melting point of the polymer B can be adjusted by the type and amount of the polymerizable monomers used, the amount of boric acid added, and the like.

The half-value width of the peak corresponding to the polymer B of the toner measured by differential scanning calorimetry is preferably not more than 2.00° C., and more preferably not more than 1.85° C. The lower the half width is, the higher the crystallinity is. Therefore, the lower limit is not particularly limited, but is preferably at least 0.50° C.

Resin Other than Polymer B

The binder resin may include, if necessary, a resin other than the polymer B. Examples of the resin other than the polymer B that can be used for the binder resin include the following resins.

Homopolymers of styrene and substitution products thereof such as polystyrene, poly-p-chlorostyrene, polyvinyl toluene, and the like; styrene copolymers such as styrene-p-chlorostyrene copolymer, styrene-vinyl toluene copolymer, styrene-vinyl naphthalin copolymer, styrene-acrylic acid ester copolymers, styrene-methacrylic acid ester copolymers, styrene-α-chloromethyl methacrylate copolymer, styrene-acrylonitrile copolymer, styrene-vinyl methyl ether copolymer, styrene-vinyl ethyl ether copolymer, styrene-vinyl methyl ketone copolymer, styrene-acrylonitrile-indene copolymer, and the like; polyvinyl chloride, phenolic resins, natural resin-modified phenolic resins, natural resin-modified maleic acid resins, acrylic resins, methacrylic resins, polyvinyl acetate, silicone resins, polyester resins, polyurethane resins, polyamide resins, furan resins, epoxy resins, xylene resins, polyvinyl butyral, terpene resins, coumarone-indene resins, petroleum resins, and the like.

Among these, styrene copolymers and polyester resins are preferable, and polyester resins are more preferable. Further, the resin other than the polymer B is preferably amorphous.

The polyester resin is preferably a condensed polymer of a carboxylic acid component and an alcohol component. Examples of the divalent carboxylic acid component constituting the polyester moiety include the following dicarboxylic acids or derivatives thereof.

Benzenedicarboxylic acids such as phthalic acid, terephthalic acid, isophthalic acid, and phthalic anhydride, anhydrides thereof, and lower alkyl esters thereof, alkyldicarboxylic acids such as succinic acid, adipic acid, sebacic acid, and azelaic acid, anhydrides thereof, and lower alkyl esters thereof; alkenyl succinic acids or alkyl succinic acids having an average number of carbon atoms of from 1 to 50, anhydrides thereof, and lower alkyl esters thereof; unsaturated dicarboxylic acids such as fumaric acid, maleic acid, citraconic acid and itaconic acid, anhydrides thereof, and lower alkyl esters thereof.

Meanwhile, examples of the dihydric alcohol component constituting the polyester segment include the following.

Ethylene glycol, polyethylene glycol, 1,2-propanediol, 1,3-propanediol, 1,3-butanediol, 1,4-butanediol, 2,3-butanediol, diethylene glycol, triethylene glycol, 1,5-pentanediol, 1,6-hexanediol, neopentyl glycol, 2-methyl-1,3-propanediol, 2-ethyl-1,3-hexanediol, 1,4-cyclohexanedimethanol (CHDM), hydrogenated bisphenol A, bisphenols represented by a formula (I-1) and derivatives thereof, and diols represented by a formula (I-2).

(I-1)

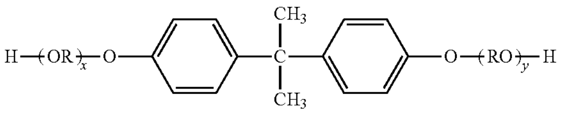

In the formula, R is an ethylene group or a propylene group, x and y are integers of 0 or more, and the average value of x+y is from 0 to 10.

(I-2)

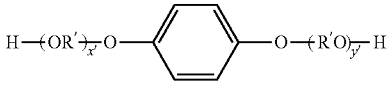

In the formula, R' is an ethylene group or a propylene group, x' and y' are integers of 0 or more, and the average value of x'+y' is from 0 to 10.

The constituent component of the polyester segment may include a tri- or higher valent carboxylic acid component and a tri- or higher hydric alcohol component in addition to the above-mentioned divalent carboxylic acid component and dihydric alcohol component.

The tri- or higher valent carboxylic acid component is not particularly limited, and examples thereof include trimellitic acid, trimellitic anhydride, pyromellitic acid, and the like.

Examples of the tri- or higher hydric alcohol component include trimethylolpropane, pentaerythritol, glycerin, and the like.

Release Agent

The toner particle may contain a wax as a release agent. Examples of the wax include the types listed below.

Hydrocarbon waxes such as low molecular weight polyethylene, low molecular weight polypropylene, alkylene copolymers, microcrystalline waxes, paraffin waxes and Fischer Tropsch waxes; oxides of hydrocarbon waxes, such as oxidized polyethylene waxes, and block copolymers thereof, waxes comprising mainly fatty acid esters, such as carnauba wax; and waxes obtained by partially or wholly deoxidizing fatty acid esters, such as deoxidized carnauba wax. Saturated straight chain fatty acids such as palmitic acid, stearic acid and montanic acid; unsaturated fatty acids such as brassidic acid, eleostearic acid and parinaric acid; saturated alcohols such as stearyl alcohol, aralkyl alcohols, behenyl alcohol, carnaubyl alcohol, ceryl alcohol and melissyl alcohol; polyhydric alcohols such as sorbitol; esters of fatty acids such as palmitic acid, stearic acid, behenic acid and montanic acid and alcohols such as stearyl alcohol, aralkyl alcohols, behenyl alcohol, carnaubyl alcohol, ceryl alcohol and melissyl alcohol; fatty acid amides such as linoleic acid amide, oleic acid amide and lauric acid amide; saturated fatty acid bisamides such as methylene bis-stearic acid amide, ethylene bis-capric acid amide, ethylene bis-lauric acid amide and hexamethylene bis-stearic acid amide; unsaturated fatty acid amides such as ethylene bis-oleic acid amide, hexamethylene bis-oleic acid amide, N,N'-dioleyladipic acid amide and N,N'-dioleylsebacic acid amide; aromatic bisamides such as m-xylene bis-stearic acid amide and N,N'-distearylisophthalic acid amide; fatty acid metal salts (commonly known as metal soaps) such as calcium stearate, calcium laurate, zinc stearate and magnesium stearate; waxes obtained by grafting vinyl monomers such as styrene and acrylic acid onto aliphatic hydrocarbon-based waxes; partial esters of fatty acids and polyhydric alcohols, such as behenic acid monoglyceride; and hydroxyl group-containing methyl ester compounds obtained by hydrogenating plant-based oils and fats.

Of these waxes, hydrocarbon waxes, such as paraffin waxes and Fischer Tropsch waxes, and fatty acid ester-based waxes, such as carnauba wax, are preferred from the perspectives of improving low-temperature fixability and fixing and separation performance. Hydrocarbon waxes are more preferred from the perspective of further improving hot offset resistance. The wax content is preferably 3 to 8 parts by mass relative to 100 parts by mass of the binder resin.

In addition, the peak temperature of the maximum endothermic peak of the wax on a rising temperature endothermic curve measured using a differential scanning calorimetric measurement (DSC) apparatus is preferably 45° C. to 140° C. If the peak temperature of the maximum endothermic peak of the wax falls within the range mentioned above, a better balance can be achieved between toner storability and hot offset resistance.

Colorant

The toner particle may contain a colorant. Examples of the colorant include those listed below.

Examples of black colorants include carbon black; and materials that are colored black through use of yellow colorants, magenta colorants and cyan colorants. The colorant may be only a pigment or a combination of a dye and a pigment. From the perspective of image quality of a full color image, it is preferable to use a combination of a dye and a pigment.

Examples of pigments for magenta toners include those listed below. C.I. Pigment Red 1, 2, 3, 4, 5, 6, 7, 8, 9, 10, 11, 12, 13, 14, 15, 16, 17, 18, 19, 21, 22, 23, 30, 31, 32, 37, 38, 39, 40, 41, 48:2, 48:3, 48:4, 49, 50, 51, 52, 53, 54, 55, 57:1, 58, 60, 63, 64, 68, 81:1, 83, 87, 88, 89, 90, 112, 114, 122, 123, 146, 147, 150, 163, 184, 202, 206, 207, 209, 238, 269 and 282; C.I. Pigment Violet 19; and C.I. Vat Red 1, 2, 10, 13, 15, 23, 29 and 35.

Examples of dyes for magenta toners include those listed below. Oil-soluble dyes such as C.I. Solvent Red 1, 3, 8, 23, 24, 25, 27, 30, 49, 81, 82, 83, 84, 100, 109 and 121; C.I. Disperse Red 9; C.I. Solvent Violet 8, 13, 14, 21 and 27; and C.I. Disperse Violet 1, and basic dyes such as C.I. Basic Red 1, 2, 9, 12, 13, 14, 15, 17, 18, 22, 23, 24, 27, 29, 32, 34, 35, 36, 37, 38, 39 and 40; and C.I. Basic Violet 1, 3, 7, 10, 14, 15, 21, 25, 26, 27 and 28.

Examples of pigments for cyan toners include those listed below. C.I. Pigment Blue 2, 3, 15:2, 15:3, 15:4, 16 and 17; C.I. Vat Blue 6; C.I. Acid Blue 45, and copper phthalocyanine pigments in which 1 to 5 phthalimidomethyl groups in the phthalocyanine skeleton are substituted. An example of a dye for a cyan toner is C.I. Solvent Blue 70.

Examples of pigments for yellow toners include those listed below. C.I. Pigment Yellow 1, 2, 3, 4, 5, 6, 7, 10, 11, 12, 13, 14, 15, 16, 17, 23, 62, 65, 73, 74, 83, 93, 94, 95, 97, 109, 110, 111, 120, 127, 128, 129, 147, 151, 154, 155, 168, 174, 175, 176, 180, 181 and 185; and C.I. Vat Yellow 1, 3 and 20. An example of a dye for yellow toner is C.I. Solvent Yellow 162.

These colorants can be used singly or as a mixture, and can be used in the form of solid solutions. These colorants are selected in view of hue angle, chroma, lightness, lightfastness, OHP transparency and dispersibility in the toner. The content of the colorant is preferably from 0.1 parts by mass to 30.0 parts by mass relative to 100 parts by mass of the binder resin.

Charge Control Agent

The toner particle may include, if necessary, a charge control agent. By compounding a charge control agent, it is possible to stabilize the charge characteristics and control the optimum triboelectric charge quantity according to the developing system. As the charge control agent, known ones can be used, but a metal compound of an aromatic carboxylic acid, which is colorless, has a high charging speed of the toner, and can stably maintain a constant charge quantity, is particularly preferable.

Examples of negative charge control agents include salicylic acid metal compounds, naphthoic acid metal compounds, dicarboxylic acid metal compounds, polymer compounds having sulfonic acid or carboxylic acid in a side chain, polymer compounds having a sulfonic acid salt or a sulfonic acid ester in a side chain, polymer compounds having a carboxylic acid salt or a carboxylic acid ester in a side chain, a boron compound, a urea compound, a silicon compound, and calixarenes.

The charge control agent may be added internally or externally to the toner particle. The amount of the charge control agent is preferably 0.2 parts by mass to 10.0 parts by mass, and more preferably 0.5 parts by mass to 10.0 parts by mass with respect to 100 parts by mass of the binder resin.

Toner Production Method

The method for producing the toner is not particularly limited, and a well-known method such as a pulverization method, a dissolution suspension method, an emulsion aggregation method or a dispersion polymerization method can be used. In any of these toner particle production methods, it is preferable to obtain a toner particle by adding a boric acid source when mixing the raw materials. Here, the toner is preferably produced using the method described below. That is, the toner is preferably produced using an emulsion aggregation method.

The method for producing a toner comprising a toner particle comprising a binder resin, wherein the method preferably comprises the following steps (1) to (3):

(1) a dispersion step of preparing a dispersion liquid of resin fine particles comprising a binder resin comprising at least a side-chain crystalline polymer B having a monomer unit A derived from at least one polymerizable monomer A selected from the group consisting of (meth)acrylic acid esters having a linear alkyl group having 18 to 36 carbon atoms;

(2) an aggregation step of mixing and aggregating at least the dispersion liquid of the resin fine particles to form aggregates; and (3) a fusion step of heating and fusing the aggregates, and boric acid is present in the dispersion liquid or the aggregate in any of steps (1) to (3). It is more preferable that boric acid be present in the dispersion liquid or the aggregate in step (1) or (2). It is even more preferable that boric acid be present in the dispersion liquid during mixing in step (2).

When the toner is produced by the emulsion aggregation method, boric acid is likely to be uniformly dispersed in the side-chain crystalline polymer B, and the crystallization of the entire toner particle is likely to be uniformly promoted.

Further, preferably, a method for producing a toner comprising a toner particle comprising a binder resin, wherein the method comprises the following steps (1) to (3):

(1) a dispersion step of preparing a dispersion liquid of resin fine particles comprising a binder resin comprising at least a side-chain crystalline polymer B having a monomer unit A derived from at least one polymerizable monomer A selected from the group consisting of (meth)acrylic acid esters having a linear alkyl group having 18 to 36 carbon atoms;

(2) an aggregation step of mixing and aggregating at least the dispersion liquid of the resin fine particle to form aggregates; and (3) a fusion step of heating and fusing the aggregates, and it is preferable that borax be added to the dispersion liquid or the aggregates in at least one of steps (1) to (3). It is more preferable that borax be added to the dispersion liquid or the aggregates in in step (1) or (2). It is even more preferable that borax be added to the dispersion liquid at least during the mixing of the dispersion liquid before aggregation in step (2).

The details of the emulsion aggregation method will be described hereinbelow.

Emulsion Aggregation Method

An emulsion aggregation method is a method in which toner particles are produced by first preparing an aqueous dispersion liquid of fine particles which comprise the constituent materials of the toner particles and which are substantially smaller than the desired particle diameter, and then aggregating these fine particles in an aqueous medium until the particle diameter of the toner particles is reached, and then carrying out heating or the like so as to fuse the resin.

That is, in an emulsion aggregation method, a toner is produced by carrying out a dispersion step for producing fine particle-dispersed solutions comprising constituent materials of the toner; an aggregation step for aggregating fine particles comprising the constituent materials of the toner so as to control the particle diameter until the particle diameter of the toner is reached; a fusion step for subjecting the resin contained in the obtained aggregated particles to melt adhesion; a cooling step thereafter; a metal removal step for filtering the obtained toner and removing excess polyvalent metal ions; a filtering/washing step for filtering the obtained toner and washing with ion exchanged water or the like; and a step for removing water from the washed toner and drying.

Step for Preparing Resin Fine Particle-Dispersed Solution (Dispersion Step)

A resin fine particle-dispersed solution can be prepared using a well-known method, but is not limited to such methods. Examples of well-known methods include an emulsion polymerization method, a self-emulsification method, a phase inversion emulsification method in which an aqueous medium is added to a resin solution dissolved in an organic solvent so as to emulsify the resin, or a forcible emulsification method in which a resin is subjected to a high temperature treatment in an aqueous medium without using an organic solvent so as to forcibly emulsify the resin.

Specifically, the binder resin is dissolved in an organic solvent that can dissolve these components, and a surfactant and a basic compound are added. In such cases, if the binder resin is a crystalline resin having a melting point, the resin should be melted by being heated to the melting point of the resin or higher. Next, resin fine particles are precipitated by slowly adding an aqueous medium while agitating by means of a homogenizer or the like. A resin fine particle-dispersed aqueous solution is then prepared by heating or lowering the pressure so as to remove the solvent. Any solvent able to dissolve the resins mentioned above can be used as the organic solvent used for dissolving the resin, but use of an organic solvent that forms a uniform phase with water, such as toluene, is preferred from the perspective of suppressing the generation of coarse particles.

The type of surfactant used in the emulsification mentioned above is not particularly limited, but examples thereof include anionic surfactants such as sulfate ester salts, sulfonic acid salts, carboxylic acid salts, phosphate esters and soaps; cationic surfactants such as amine salts and quaternary ammonium salts; and non-ionic surfactants such as polyethylene glycol type surfactants, adducts of ethylene oxide to alkylphenols, and polyhydric alcohol type surfactants. It is possible to use one of these surfactants in isolation, or a combination of two or more types thereof.

Examples of the basic compound used in the dispersion step include inorganic bases such as sodium hydroxide and potassium hydroxide, and organic bases such as ammonia, triethylamine, trimethylamine, dimethylaminoethanol and diethylaminoethanol. It is possible to use one of these basic compounds in isolation, or a combination of two or more types thereof.

In addition, the 50% particle diameter on a volume basis (D50) of the binder resin fine particles in the resin fine particle-dispersed aqueous solution is preferably 0.05 μm to 1.0 μm, and more preferably 0.05 μm to 0.4 μm. By adjusting the 50% particle diameter (D50) on a volume basis within the range mentioned above, it is easy to obtain a toner particle having a diameter 3 μm to 10 μm, which is a suitable volume average particle diameter for the toner particle.

Moreover, a dynamic light scattering particle size distribution analyzer (Nanotrac UPA-EX150 produced by Nikkiso Co., Ltd.) was used to measure the 50% particle diameter on a volume basis (D50).

Colorant Fine Particle-Dispersed Solution

A colorant fine particle-dispersed solution, which is used according to need, can be prepared using a well-known method given below, but is not limited to such methods.

The colorant fine particle-dispersed solution can be prepared by mixing a colorant, an aqueous medium and a dispersing agent using a well-known mixing machine such as a stirring machine, an emulsifying machine or a dispersing machine. It is possible to use a well-known dispersing agent such as a surfactant or a polymer dispersing agent as the dispersing agent used in this case.

Whether the dispersing agent is a surfactant or a polymer dispersing agent, the dispersing agent can be removed by means of the washing step described below, but a surfactant is preferred from the perspective of washing efficiency.

Examples of the surfactant include anionic surfactants such as sulfate ester salts, sulfonic acid salts, phosphate esters and soaps; cationic surfactants such as amine salts and quaternary ammonium salts; and non-ionic surfactants such as polyethylene glycol type surfactants, adducts of ethylene oxide to alkylphenols, and polyhydric alcohol type surfactants.

Of these, non-ionic surfactants and anionic surfactants are preferred. In addition, it is possible to use a combination of a non-ionic surfactant and an anionic surfactant. It is possible to use one of these surfactants in isolation, or a combination of two or more types thereof. The concentration of the surfactant in the aqueous medium is preferably 0.5 mass % to 5 mass %.

The content of colorant fine particles in the colorant fine particle-dispersed solution is not particularly limited, but is preferably 1 mass % to 30 mass % relative to the total mass of the colorant fine particle-dispersed solution.

In addition, the dispersed particle diameter of colorant fine particles in the colorant fine particle-dispersed aqueous solution is preferably such that the 50% particle diameter on a volume basis (D50) is 0.5 μm or less from the perspective of dispersibility of the colorant in the ultimately obtained toner. For similar reasons, the 90% particle diameter on a volume basis (D90) is preferably 2 μm or less. Moreover, the dispersed particle diameter of colorant fine particles in the colorant fine particle-dispersed solution is measured using a dynamic light scattering particle size distribution analyzer (Nanotrac UPA-EX150 produced by Nikkiso Co., Ltd.).

Examples of well-known mixing machines such as stirring machines, emulsifying machines and dispersing machines used when dispersing the colorant in the aqueous medium include ultrasonic homogenizers, jet mills, pressurized homogenizers, colloid mills, ball mills, sand mills and paint shakers. It is possible to use one of these mixing machines in isolation, or a combination thereof.

Dispersed Solution of Fine Particle of Release Agent (Aliphatic Hydrocarbon Compound)

A release agent fine particle-dispersed solution may be used if necessary. The release agent fine particle-dispersed solution can be prepared using the well-known method given below, but is not limited to this well-known method.

The release agent fine particle-dispersed solution can be prepared by adding a release agent to an aqueous medium containing a surfactant, heating to a temperature that is not lower than the melting point of the release agent, dispersing in a particulate state using a homogenizer having a strong shearing capacity (for example, a "Clearmix W-Motion" produced by M Technique Co., Ltd.) or a pressure discharge type dispersing machine (for example, a "Gaulin homogenizer" produced by Gaulin), and then cooling to a temperature that is lower than the melting point of the release agent.

In addition, the dispersed particle diameter of the release agent fine particle-dispersed solution in the aqueous dispersion of the release agent is such that the 50% particle diameter on a volume basis (D50) is preferably 0.03 μm to 1.0 μm, and more preferably 0.1 μm to 0.5 μm. In addition, it is preferable for coarse wax particles having diameters of at least 1 m not to be present.

If the dispersed particle diameter in the release agent fine particle-dispersed solution falls within the range mentioned above, the release agent can be finely dispersed in the toner, an outmigration effect can be exhibited to the maximum possible extent at the time of fixing, and good separation properties can be achieved. Moreover, the dispersed particle diameter of the release agent fine particle-dispersed solution dispersed in the aqueous medium can be measured using a dynamic light scattering particle size distribution analyzer (a Nanotrac UPA-EX150 produced by Nikkiso Co., Ltd.).

Mixing Step

In the mixing step, a mixed liquid is prepared by mixing the resin fine particle-dispersed solution and, if necessary, at least one of the release agent fine particle-dispersed solution and the colorant fine particle-dispersed solution. It is possible to use a well-known mixing apparatus, such as a homogenizer or a mixer.

Step for Forming Aggregate Particles (Aggregation Step)

In the aggregation step, fine particles contained in the mixed solution prepared in the mixing step are aggregated so as to form aggregates having the target particle diameter. Here, by adding and mixing a flocculant and applying heat and/or a mechanical force as appropriate if necessary, aggregates are formed through aggregation of resin fine particles and, if necessary, release agent fine particles and/or colorant fine particles.

Examples of flocculants include organic flocculants, such as quaternary salt type cationic surfactants and polyethyleneimines; and inorganic flocculants, such as inorganic metal salts such as sodium sulfate, sodium nitrate, sodium chloride, calcium chloride and calcium nitrate; inorganic ammonium salts such as ammonium sulfate, ammonium chloride and ammonium nitrate; and divalent or higher metal complexes. In addition, an acid may be added in order to lower the pH and effect soft aggregation, and sulfuric acid, nitric acid, or the like, can be used.

The flocculant may be added in the form of a dry powder or an aqueous solution dissolved in an aqueous medium, but adding the flocculant in the form of an aqueous solution is preferred in order to bring about uniform aggregation. In addition, it is preferable for the flocculant to be added and mixed at a temperature that is not higher than the glass transition temperature or melting point of the resin contained in the mixed solution. By mixing under these temperature conditions, aggregation progresses relatively uniformly. When mixing the flocculant in the mixed solution, it is possible to use a well-known mixing apparatus, such as a homogenizer or a mixer. The aggregation step is a step in which toner particle-sized aggregates are formed in the aqueous medium. The volume average particle diameter of aggregates produced in the aggregation step is preferably 3 μm to 10 μm. The volume average particle diameter can be measured using a particle size distribution analyzer that uses the Coulter principle (a Coulter Multisizer III: produced by Beckman Coulter, Inc.).

Step for Obtaining Dispersed Solution Containing Toner Particles (Fusion Step)

In the fusion step, aggregation is first stopped in the dispersed solution containing aggregates obtained in the aggregation step while agitating in the same way as in the aggregation step. The aggregation is stopped by adding an aggregation-stopping agent able to adjust the pH, such as a base, a chelate compound or an inorganic compound such as sodium chloride.

After the dispersed state of aggregated particles in the dispersed solution has stabilized as a result of the action of the aggregation-stopping agent, the aggregated particles are fused and a desired particle diameter is achieved by being heated to a temperature that is not lower than the glass transition temperature or melting point of the binder resin. Moreover, the 50% particle diameter on a volume basis (D50) of the toner particles is preferably 3 μm to 10 μm.

Cooling Step

If necessary, the temperature of the dispersed solution containing the toner particles obtained in the fusion step is lowered in the cooling step to a temperature that is lower than the crystallization temperature and/or glass transition temperature of the binder resin. By cooling to a temperature that is lower than the crystallization temperature and/or the glass transition temperature, it is possible to prevent coarse particles from being generated. A specific cooling rate can be 0.1° C./min to 50° C./min.

Post-Treatment Steps

In the toner production method, post-treatment steps such as a washing step, a solid-liquid separation step and a drying step may be carried out after the cooling step, and toner particles can be obtained in a dry state by carrying out these post-treatment steps.

External Addition Step

Obtained toner particles may be used as-is as a toner.

In the external addition step, inorganic fine particles are, if necessary, externally added to the toner particles obtained in the drying step. Specifically, it is preferable to add inorganic fine particles such as silica or fine particles of a resin such as a vinyl resin, a polyester resin or a silicone resin while applying a shearing force in a dry state.

In the method for producing the toner, it is preferable that boric acid be present in any of the following steps (1) to (3). The method for producing the toner preferably includes a step of adding a boric acid source (preferably borax) in at least one of steps (1) to (3). More preferably, a boric acid source (preferably borax) is added to the dispersion liquid during the mixing of the dispersion liquid before aggregation in step (2).

Where boric acid is present in the dispersion liquid or the aggregates in the following steps (1) to (3), it becomes easy to obtain the crystallization promoting effect in the final crystallization step.

(1) A dispersion step of preparing a dispersion liquid of resin fine particles comprising a binder resin comprising at least a side-chain crystalline polymer B having a monomer unit A derived from at least one polymerizable monomer A selected from the group consisting of (meth)acrylic acid esters having a linear alkyl group having 18 to 36 carbon atoms;

(2) an aggregation step of mixing and aggregating at least the resin fine particle dispersion liquid to form aggregates; and (3) a fusion step of heating and fusing the aggregates, and in the aggregation step, boric acid may be added in the middle of the step.

The boric acid source may be boric acid or a compound that can be changed to boric acid by pH control or the like during toner production. For example, a boric acid source may be added and control may be performed so that boric acid is contained in the aggregate in at least step (3).

Boric acid may be present in the aggregate in an unsubstituted state. The boric acid source is preferably at least one selected from the group consisting of organic boric acid, boric acid salts, boric acid esters, and the like. When the toner is produced in an aqueous medium, it is preferable to add a boric acid salt from the viewpoint of reactivity and production stability. Specifically, the boric acid source more preferably includes at least one selected from the group consisting of sodium tetraborate, borax, ammonium borate, and the like, and even more preferably borax.

Borax is represented by decahydrate of sodium tetraborate $Na_2B_4O_7$ and changes to boric acid in an acidic aqueous solution. Therefore, borax is preferably used when the boric acid source is to be used in an acidic environment in an aqueous medium. As a method of addition, either a dry powder or an aqueous solution obtained by dissolving in an aqueous medium may be added, but in order to cause uniform aggregation, it is preferable to add borax in the form of an aqueous solution.

The addition of borax may be carried out in any of steps (1) to (3). Preferably, borax is added and mixed in at least one of steps (1) and (2). More preferably, an aqueous borax solution is added to and mixed with the dispersion liquid to make the dispersion liquid acidic when mixing the dispersion liquid before aggregation in step (2). The concentration of the aqueous solution may be changed, as appropriate, according to the concentration at which boric acid is to be contained in the toner, and is, for example, 1% by mass to 20% by mass. In order to change to boric acid, it is preferable to set the pH to acidic conditions before mixing, during mixing or after addition. For example, the pH may be controlled to 1.5 to 5.0, and preferably 2.0 to 4.0.

Next, methods for measuring physical properties will be described.

Method for Measuring Content Ratio of Monomer Units Derived from Various Polymerizable Monomers in Polymer B The content ratio of monomer units derived from various polymerizable monomers in the polymer B is measured by $^1$H-NMR under the following conditions.

Measuring device: FT NMR device JNM-EX400 (manufactured by JEOL Ltd.)
Measurement frequency: 400 MHz
Pulse condition: 5.0 μs
Frequency range: 10,500 Hz
Cumulative number: 64 times
Measurement temperature: 30° C.
Sample: prepared by plating 50 mg of the measurement sample in a sample tube with an inner diameter of 5 mm, adding deuterated chloroform ($CDCl_3$) as a solvent, and dissolving in a constant temperature bath at 40° C.

From the obtained $^1$H-NMR chart, from the peaks attributed to the constituent components of the monomer unit A, a peak independent of the peaks attributable to the constituent components of other derived monomer units is selected, and the integrated value $S_1$ of this peak is calculated.

Similarly, from the peaks attributed to the constituent components of the monomer unit C, a peak independent of the peaks attributable to the constituent components of other derived monomer units is selected, and the integrated value $S_2$ of this peak is calculated.

Further, in the case of having the polymerizable monomer D, from the peaks attributed to the constituent components of the monomer unit D, a peak independent of the peaks attributable to the constituent components of other derived monomer units is selected, and the integrated value $S_3$ of this peak is calculated.

The content ratio of the monomer unit A is determined as follows using the above integrated values $S_1$, $S_2$, and $S_3$. Here, $n_1$, $n_2$, and $n_3$ are the number of hydrogen atoms in the constituent component to which the peak related to each segment is attributed.

$$\text{Content ratio of monomer unit } A\text{(mol \%)}=\{(S_1/n_1)/((S_1/n_1)+(S_2/n_2)+(S_3/n_3))\}\times 100$$

Similarly, the content ratios of the monomer unit C and the monomer unit D are determined as follows.

$$\text{Content ratio of monomer unit } C\text{ (mol \%)}=\{(S_2/n_2)/((S_1/n_1)+(S_2/n_2)+(S_3/n_3))\}\times 100$$

$$\text{Content ratio of monomer unit } D\text{ (mol \%)}=\{(S_3/n_3)/((S_1/n_1)+(S_2/n_2)+(S_3/n_3))\}\times 100$$

When a polymerizable monomer containing no hydrogen atom is used as a constituent component other than the vinyl group in the polymer B, the measured nucleus is set to $^{13}$C using $^{13}$C-NMR, the measurement is performed in a single pulse mode and the calculation is carried out in the same manner as in $^1$H-NMR.

Also, when toner particles are manufactured by the suspension polymerization method, peaks of a release agent and other resins may overlap and independent peaks may not be observed. As a result, the content ratio of the monomer units derived from various polymerizable monomers in the polymer B may not be calculated. In that case, a polymer B' can be produced by performing the same suspension polymerization without using the release agent or other resin, and analysis can be performed by considering the polymer B' as the polymer B.

Method for Calculating SP Values

The SP values such as $SP_{12}$, $SP_{22}$, and the like are obtained as follows according to the calculation method proposed by Fedors.

For each polymerizable monomer, the evaporation energy (Δei) (cal/mol) and molar volume (Δvi) ($cm^3$/mol) are determined for atoms or atomic groups in the molecular structure from the table described in "Polym. Eng. Sci., 14 (2), 147-154 (1974)", and $(4.184\times\Sigma\Delta ei/\Sigma\Delta vi)^{0.5}$ is defined as the SP value $(J/cm^3)^{0.5}$.

Meanwhile, $SP_{11}$ and $SP_{21}$ are calculated by the same calculation method as above for atoms or atomic groups of a molecular structure in which the double bond of the polymerizable monomer is cleaved by polymerization.

Identification and Determination of Content of Boric Acid in Toner

Identification and content measurement of boric acid contained in the toner are carried out using the following method.

Whether or not a toner contains boric acid can be confirmed using an infrared absorption spectrum. Specifically, a suitable amount of a sample resin of a toner or toner particle is mixed with potassium bromide (KBr) and molded. An infrared absorption spectrum is measured using this. Because a boric acid vibration is present at an absorption wavelength of 1380 $cm^1$, it is possible to confirm the presence of boric acid.

In addition, it is possible to confirm whether or not boron derived from boric acid is present in an observed cross section by carrying out elemental analysis by means of energy dispersive X-Ray spectroscopy (EDX) using a transmission electron microscope (TEM).

When the content of boric acid contained in the toner is measured, fluorescence X-Ray measurements are carried out, and the content is determined using a calibration curve. More specifically, an aluminum ring (internal diameter 40 mm, external diameter 43 mm, height 5 mm) is placed on a sample molding die of a semi-automatic MiniPress machine (produced by Specac). A measurement pellet was produced by placing 3 g of toner in this ring and press molding for 1 minute at a pressure of 15 t. A molded pellet having a thickness of approximately 3 mm and a diameter of approximately 40 mm is used. Measurements are carried out under the following conditions using a wavelength-dispersive X-Ray fluorescence analysis apparatus (Axios produced by PANalytical) and dedicated software for this apparatus (SuperQ ver.4.0F produced by PANalytical) in order to set measurement conditions and analyze measured data. Rh is used as the X-Ray bulb anode, the measurement atmosphere is a vacuum, the measurement diameter (collimator mask diameter) is 27 mm, and the measurement time is 10 seconds. In addition, detection is carried out using a proportional counter (PC) in the case of boron.

The accelerating voltage of the X-Ray generator is 32 kV, and the current is 125 mA.

Measurements are carried out under the conditions described above, boron is identified on the basis of obtained X-Ray peak position, and count rate (units: cps), which is the number of X-Ray photons per unit time, is measured. In addition, the amount (mass %) of boric acid in the toner is determined from a separately prepared boric acid calibration curve.

In order to eliminate effects caused by external additives, measurements can, if necessary, be carried out using toner particles obtained by removing external additives from the toner using the following method.

A concentrated sucrose solution is prepared by adding 160 g of sucrose (produced by Kishida Chemical Co., Ltd.) to 100 mL of ion exchanged water and dissolving the sucrose while immersing in hot water. 31 g of the concentrated sucrose solution and 6 mL of Contaminon N (a 10 mass % aqueous solution of a neutral detergent for cleaning precision measurement equipment, which has a pH of 7 and comprises a non-ionic surfactant, an anionic surfactant and an organic builder, produced by Wako Pure Chemical Industries, Ltd.) are placed in a centrifugal separation tube (capacity 50 mL). 1.0 g of toner is added to this and lumps of the toner are broken into smaller pieces using a spatula or the like. The centrifugal separation tube is shaken for 20 minutes at a rate of 300 spm (strokes per min) using a shaker (AS-1N produced by As One Corporation). Following the shaking, the solution is transferred to a (50 mL) swing rotor glass tube and subjected to separation for 30 minutes at 3500 rpm using a centrifugal separator (an H-9R, produced by Kokusan Co., Ltd.).

Toner particles are separated from external additives in this procedure. It is confirmed by visual inspection that toner particles are sufficiently separated from the aqueous solution, and toner particles separated into the uppermost layer are collected using a spatula or the like. A measurement sample is obtained by filtering the collected toner particles using a vacuum filtration device and then drying for 1 hour or longer using a dryer. This procedure is carried out multiple times in order to ensure the required amount.

Method for Measuring Weight Average Molecular Weight (Mw) and Number Average Molecular Weight (Mn) of Polymer B and Amorphous Resin The weight average molecular weight (Mw) and the number average molecular weight (Mn) of the tetrahydrofuran (THF) soluble fractions of the polymer B and the amorphous resin are measured by gel permeation chromatography (GPC) in the following manner.

First, a sample is dissolved in tetrahydrofuran (THF) at room temperature for 24 h. Then, the obtained solution is filtered with a solvent-resistant membrane filter "Maishori Disk" (manufactured by Tosoh Corporation) having a pore diameter of 0.2 m to obtain a sample solution. The sample solution is adjusted so that the concentration of the component soluble in THF is 0.8% by mass. This sample solution is used for measurement under the following conditions.

Device: HLC8120 GPC (detector: RI) (manufactured by Tosoh Corporation)

Columns: seven columns of Shodex KF-801, 802, 803, 804, 805, 806, and 807 (manufactured by Showa Denko K. K.)

Eluent: tetrahydrofuran (THF)

Flow velocity: 1.0 m/min

Oven temperature: 40.0° C.

Sample injection amount: 0.10 mL

In calculating the molecular weight of the sample, a molecular weight calibration curve prepared using standard polystyrene resins (trade names "TSK Standard Polystyrene F-850, F-450, F-288, F-128, F-80, F-40, F-20, F-10," F-4, F-2, F-1, A-5000, A-2500, A-1000, and A-500", manufactured by Tosoh Corporation) is used.

Method for Measuring Acid Value

The acid value is the number of milligrams of potassium hydroxide required to neutralize the acid contained in 1 g of the sample. The acid value of a resin such as polymer B is measured according to JIS K 0070-1992, but specifically, it is measured according to the following procedure.

(1) Preparation of Reagents

A total of 1.0 g of phenolphthalein is dissolved in 90 mL of ethyl alcohol (95% by volume), and ion-exchanged water is added to make 100 mL to obtain a phenolphthalein solution.

A total of 7 g of special grade potassium hydroxide is dissolved in 5 mL of water, and ethyl alcohol (95% by volume) is added to make 1 L. The solution is placed in an alkali-resistant container so as to prevent contact with carbon dioxide gas, allowed to stand for 3 days, and then filtered to obtain a potassium hydroxide solution. The resulting potassium hydroxide solution is stored in an alkali-resistant container. A total of 25 ml of 0.1 mol/L hydrochloric acid is placed in a triangular flask, a few drops of the phenolphthalein solution is added, titration with the potassium hydroxide solution is performed, and a factor of the potassium hydroxide solution is found from the amount of the potassium hydroxide solution required for neutralization. The 0.1 mol/L hydrochloric acid is prepared for use according to JIS K 8001-1998.

(2) Operation (A) Main Test

A total of 2.0 g of the pulverized polymer B sample is weighed into a 200 mL Erlenmeyer flask, 100 mL of a mixed solution of toluene/ethanol (2:1) is added, and dissolution is performed over 5 h. Then, a few drops of the phenolphthalein solution are added as an indicator, and titration is performed using the potassium hydroxide solution. The end point of the titration is when the light red color of the indicator continues for 30 sec.

(B) Blank Test

The same titration as in the operation above is performed, except that no sample is used (that is, only a mixed solution of toluene/ethanol (2:1) is used).

(3) The Obtained Result is Substituted into the Following Formula to Calculate the Acid Value.

$$A=[(C-B)\times f\times 5.61]/S$$

Here, A: acid value (mg KOH/g), B: addition amount of potassium hydroxide solution in the blank test (ml), C: addition amount of potassium hydroxide solution in the main test (mL), f factor of potassium hydroxide solution, S: mass (g) of the sample.

Method for Measuring Melting Point and Half-Value Width of Toner

The melting point and half-value width of the crystal peak corresponding to the side-chain crystalline polymer B of the toner are measured using DSC Q1000 (manufactured by TA Instruments) under the following conditions.

Temperature rise rate: 10° C./min
Measurement start temperature: 20° C.
Measurement end temperature: 180° C.

The temperature correction of the device detector uses the melting points of indium and zinc, and the heat of fusion of indium is used for the correction of the quantity of heat. Specifically, 5 mg of the sample is precisely weighed and placed in an aluminum pan, and differential scanning calorimetry measurement is performed. An empty silver pan is used as a reference.

The peak temperature of the maximum endothermic peak in the first temperature rise process is defined as the melting point (° C.). For the half-value width, the value automatically calculated from the analysis software is used. The half-value width here is also referred to as the full width at half maximum. When there is a plurality of peaks, the peak that maximizes the endothermic quantity is used for the determination. Whether the peak corresponds to the polymer B is determined by comparing with the measured peak of the polymer B separated from the toner or a sample prepared by preparing the polymer B for which the composition has been known in advance.

Method for Measuring Glass Transition Temperature Tg of Amorphous Resin

The glass transition temperature Tg is measured using a "Q2000" differential scanning calorimeter (produced by TA Instruments). Temperature calibration of the detector in the apparatus is performed using the melting points of indium and zinc, and heat amount calibration is performed using the heat of fusion of indium. Specifically, 5 mg of a sample is precisely weighed out and placed in an aluminum pan, an empty aluminum pan is used as a reference, and measurements are carried out at a temperature increase rate of 10° C./min.

A change in specific heat is determined within the temperature range of 40° C. to 100° C. in a temperature increase step. Here, the glass transition temperature of the resin is deemed to be the point at which the differential thermal analysis curve intersects with the line at an intermediate point on the baseline before and after a change in specific heat occurs.

Measurement of Particle Diameter of Toner Particle

The particle diameter of the toner particle can be measured using a pore electrical resistance method. For example, measurements and calculations can be carried out using a "Coulter Counter Multisizer 3" and accompanying software (Beckman Coulter Multisizer 3 Version 3.51 produced by Beckman Coulter, Inc.).

An apparatus for precisely measuring particle size distribution by means of a pore electrical resistance method is used ("Coulter Counter Multisizer 3" and accompanying software "Beckman Coulter Multisizer 3 Version 3.51" (produced by Beckman Coulter, Inc.)). Measurements are carried out using 25,000 effective measurement channels and an aperture diameter of 100 μm, and calculations are carried out by analyzing measured data.

A solution obtained by dissolving special grade sodium chloride in ion exchanged water at a concentration of approximately 1 mass %, such as "ISOTON II" (produced by Beckman Coulter), can be used as an aqueous electrolyte solution used in the measurements.

Moreover, the dedicated software was set up as follows before carrying out measurements and analysis.

On the "Standard Operating Method (SOM) alteration screen" in the dedicated software, the total count number in control mode is set to 50,000 particles, the number of measurements is set to 1, and the Kd value is set to "standard particle 10.0 μm" (Beckman Coulter). By pressing the threshold value/noise level measurement button, threshold values and noise levels are automatically set. In addition, the current is set to 1600 μA, the gain is set to 2, the electrolyte solution is set to ISOTON II (product name), and the "Flush aperture tube after measurement" option is checked.

On the "Screen for converting from pulse to particle diameter" in the dedicated software, the bin interval is set to logarithmic particle diameter, the particle diameter bin is set to 256 particle diameter bin, and the particle diameter range is set to from 2 μm to 60 μm.

The specific measurement method is as follows.

(1) 200 mL of the aqueous electrolyte solution is placed in a dedicated Multisizer 3 250 mL glass round bottomed beaker, the beaker is set on a sample stand, and a stirring rod is rotated anticlockwise at a rate of 24 rotations/second. By carrying out the "Aperture tube flush" function of the dedicated software, dirt and bubbles in the aperture tube are removed.

(2) Approximately 30 mL of the aqueous electrolyte solution is placed in a 100 mL glass flat bottomed beaker. To this is added approximately 0.3 mL of a diluted liquid obtained by diluting Contaminon N (product name) (a 10 mass % aqueous solution of a neutral detergent for cleaning precision measurement equipment; produced by Wako Pure Chemical Industries, Ltd.) 3-fold in terms of mass with ion exchanged water.

(3) A prescribed amount of ion exchanged water and approximately 2 mL of Contaminon N (product name) are added to a water tank in an ultrasonic wave disperser (product name: Ultrasonic Dispersion System Tetora 150 produced by Nikkaki Bios Co., Ltd.) having an electrical output of 120 W, in which 2 oscillators having an oscillation frequency of 50 kHz are housed so that their phases are staggered by 180°.

(4) The beaker used in step (2) above is placed in a beaker-fixing hole in the ultrasonic wave disperser, and the ultrasonic wave disperser is activated. The height of the beaker is adjusted so that the resonant state of the liquid surface of the aqueous electrolyte solution in the beaker is at a maximum.

(5) While the aqueous electrolyte solution in the beaker mentioned in section (4) above is being irradiated with ultrasonic waves, approximately 10 mg of toner (particles) are added a little at a time to the aqueous electrolyte solution and dispersed therein. The ultrasonic wave dispersion treatment is continued for a further 60 seconds. Moreover, when carrying out the ultrasonic wave dispersion, the temperature of the water bath is adjusted as appropriate to a temperature of from 10° C. to 40° C.

(6) The aqueous electrolyte solution mentioned in section (5) above, in which the toner (particles) are dispersed, is added dropwise by means of a pipette to the round bottomed beaker mentioned in section (1) above, which is disposed on the sample stand, and the measurement concentration is adjusted to approximately 5%. Measurements are carried out until the number of particles measured reaches 50,000.

(7) The weight average particle diameter (D4) is calculated by analyzing measurement data using the accompanying dedicated software. Moreover, when setting the graph/vol. % with the dedicated software, the "average diameter" on the analysis/volume-based statistical values (arithmetic mean) screen is weight average particle diameter (D4). When setting the graph/no. % with the dedicated software, the "average diameter" on the "Analysis/number-based statistical values (arithmetic mean)" screen is number average particle diameter (D1).

EXAMPLES

The present invention will now be explained in greater detail by means of the following working examples and comparative examples, but is in no way limited to these examples. Moreover, "parts" in formulations below are on a mass basis unless explicitly stated otherwise.

Preparation of Side-Chain Crystalline Polymer B1

The following materials were put under a nitrogen atmosphere into a reaction vessel equipped with a reflux condenser, a stirrer, a thermometer, and a nitrogen introduction tube.

Toluene: 100.0 parts

Monomer composition: 100.0 parts (The monomer composition is assumed to be a mixture of the following behenyl acrylate, methacrylonitrile and styrene in the proportions shown below).

(Behenyl acrylate (polymerizable monomer A): 67.0 parts (28.9 mol %))

(Methacrylonitrile (polymerizable monomer C): 22.0 parts (53.8 mol %))

(Styrene (polymerizable monomer D): 11.0 parts (17.3 mol %))

t-Butyl peroxypivalate: 0.5 parts (Polymer initiator, manufactured by NOF Corporation: Perbutyl PV)

The components inside of the reaction vessel were stirred at 200 rpm and heated to 70° C., and a polymerization reaction was carried out for 12 h to obtain a solution in which the polymer of the monomer composition was dissolved in toluene. Subsequently, after the temperature of the solution was lowered to 25° C., the solution was poured into 1000.0 parts of methanol with stirring to precipitate a methanol-insoluble matter. The obtained methanol-insoluble matter was filtered off, washed with methanol, and vacuum dried at 40° C. for 24 h to obtain a side-chain crystalline polymer B1. The side-chain crystalline polymer B1 had a weight average molecular weight (Mw) of 68,900, an acid value of 0.0 mg KOH/g, and a melting point of 63° C.

NMR analysis showed that the polymer B1 included 28.9 mol % of the monomer unit made of behenyl acrylate, 53.8 mol % of the monomer unit made of methacrylnitrile, and 17.3 mol % of the monomer unit made of styrene. In addition, the SP value of the monomer unit was calculated.

Production Examples of Side-Chain Crystalline Polymers B2 to B15

Side-chain crystalline polymers B2 to B15 were obtained by carrying out the reaction in the same manner as in the production example of the side-chain crystalline polymer B1, except that the polymerizable monomers and the number of parts thereof were changed as shown in Table 1. Table 2 shows the physical properties of the side-chain crystalline polymers B1 to B15. Table 3 shows the SP values of each polymerizable monomer and monomer unit used in the production examples.

Preparation of Amorphous Resin 1 Other than Side-Chain Crystalline Polymer B

The following raw materials were charged into a heat-dried two-necked flask while introducing nitrogen.

Polyoxypropylene (2.2)-2,2-bis(4-hydroxyphenyl) propane: 30.0 parts

Polyoxyethylene (2.2)-2,2-bis(4-hydroxyphenyl) propane: 33.0 parts

Terephthalic acid: 21.0 parts

Dodecenyl succinic acid: 15.0 parts

Dibutyltin oxide: 0.1 parts

After replacing the inside of the system with nitrogen by a depressurization operation, stirring was performed at 215° C. for 5 h. Then, the temperature was gradually raised to 230° C. under reduced pressure while continuing stirring, and the mixture was kept for another 2 h. An amorphous resin 1 which is an amorphous polyester was synthesized by air-cooling when a viscous state was assumed and stopping the reaction. The amorphous resin 1 had a number average molecular weight (Mn) of 5200, a weight average molecular weight (Mw) of 23,000, and a glass transition temperature (Tg) of 55° C.

Preparation of Amorphous Resin 2 Other than Side-Chain Crystalline Polymer B

Solvent: 100.0 parts of xylene

Styrene: 95.0 parts n-Butyl acrylate: 5.0 parts

Polymer initiator (t-butyl peroxypivalate; manufactured by NOF Corporation: Perbutyl PV): 0.3 parts The above materials were put under a nitrogen atmosphere into a reaction vessel equipped with a reflux condenser, a stirrer, a thermometer, and a nitrogen introduction tube. The components inside of the reaction vessel were heated to 185° C. while stirring at 200 rpm, and the polymerization reaction was carried out for 10 h. Subsequently, the solvent was removed, and vacuum drying was performed at 40° C. for 24 hours to obtain a styrene acrylic amorphous resin 2. The weight average molecular weight Mw of the amorphous resin 2 was 35,000, the glass transition temperature Tg was 58° C., and the acid value was 0.0 mg KOH/g.

Production Example of Polymer Fine Particles 1 Dispersion Liquid

Toluene (manufactured by Wako Pure Chemical Industries, Ltd.): 300 parts

Side-chain crystalline polymer B-1: 100 parts

The above materials were weighed and mixed and dissolved at 90° C. Separately, 5.0 parts of sodium dodecylbenzenesulfonate and 10.0 parts of sodium laurate were added to 700 parts of ion-exchanged water and dissolved by heating at 90° C.

Next, the toluene solution and the aqueous solution were mixed and stirred at 7000 rpm using ultra-high-speed stirring device T. K. Robomix (manufactured by PRIMIX Corporation). Emulsification was then performed at a pressure of 200 MPa using a high-pressure impact disperser Nanomizer (manufactured by Yoshida Kikai Kogyo Co., Ltd.). Then, toluene was removed using an evaporator, and the concentration was adjusted with ion-exchanged water to obtain an aqueous dispersion liquid (polymer fine particle 1 dispersion liquid) having the concentration of polymer fine particles 1 of 20% by mass.

The volume-based 50% particle diameter (D50) of the polymer fine particles 1 was measured using a dynamic light scattering type particle size distribution meter Nanotrack UPA-EX150 (manufactured by Nikkiso Co., Ltd.) and found to be 0.40 m.

Production Examples of Polymer Fine Particle 2 to 18 Dispersion Liquids

Polymer fine particle 2 to 18 dispersion liquids were obtained by performing emulsification in the same manner as in the production example of the polymer fine particle 1 dispersion liquid, except that the side-chain crystalline polymer and the amorphous resin were changed as shown in Table 4. Table 4 shows the physical properties of the polymer fine particle 1 to 18 dispersion liquids.

Production Examples of Polymer Fine Particle 19 Dispersion Liquid and Polymer Fine Particles 20 Dispersion Liquid Tetrahydrofuran (manufactured by Wako Pure Chemical Industries, Ltd.): 300 parts
Amorphous resin 1: 100 parts
Anionic surfactant Neogen RK (manufactured by DKS Co., Ltd.): 0.5 parts The above materials were weighed, mixed and dissolved. Next, 20.0 parts of 1 mol/L ammonia water was added, and stirring was performed at 4000 rpm using ultra-high-speed stirring device T. K. Robomix (manufactured by PRIMIX Corporation). Further, 700 parts of ion-exchanged water was added at a rate of 8 g/min to precipitate fine particles of the amorphous resin 1. Then, tetrahydrofuran was removed using an evaporator, and the concentration was adjusted with ion-exchanged water to obtain an aqueous dispersion liquid (polymer fine particle 19 dispersion liquid) having the concentration of the fine particles of amorphous resin 1 of 20% by mass. The volume-based 50% particle diameter (D50) of the polymer fine particle 19 dispersion liquid was 0.13 μm.

The polymer fine particle 20 dispersion liquid was obtained in the same manner as in the preparation example of the polymer fine particles 19 dispersion liquid, except that the amorphous resin 1 was replaced with the amorphous resin 2.

Production Example of Release Agent Fine Particle-Dispersed Solution

Release agent: HNP-51 (produced by Nippon Seiro Co., Ltd.): 100 parts
Anionic surfactant (Neogen RK produced by Dai-ichi Kogyo Seiyaku Co., Ltd.): 5 parts
Ion exchanged water: 395 parts The materials listed above were weighed out and placed in a mixing vessel equipped with a stirring device, heated to 90° C. and dispersed for 60 minutes by being circulated in a Clearmix W-Motion (produced by M Technique Co., Ltd.). The dispersion treatment conditions were as follows.

Rotor outer diameter: 3 cm
Clearance: 0.3 mm
Rotational speed of rotor: 19,000 rpm
Rotational speed of screen: 19,000 rpm Following the dispersion treatment, an aqueous dispersed solution in which the concentration of release agent fine particles was 20 mass % (a release agent fine particle-dispersed solution) was obtained by cooling to 40° C. under cooling conditions whereby the rotor rotational speed was 1000 rpm, the screen rotational speed was 0 rpm and the cooling rate was 10° C./min.

The 50% particle diameter on a volume basis (D50) of the release agent (aliphatic hydrocarbon compound) fine particles was measured using a dynamic light scattering particle size distribution analyzer (a Nanotrac UPA-EX150 produced by Nikkiso Co., Ltd.), and found to be 0.15 m.

Production of Colorant Fine Particle-Dispersed Solution

Colorant: 50.0 parts
(Cyan pigment, Pigment Blue 15:3 produced by Dainichiseika Color and Chemicals Mfg. Co., Ltd.)
Anionic surfactant (Neogen RK produced by Dai-ichi Kogyo Seiyaku Co., Ltd.): 7.5 parts
Ion exchanged water: 442.5 parts An aqueous dispersed solution containing colorant fine particles at a concentration of 10 mass % (a colorant fine particle-dispersed solution) was obtained by weighing out, mixing and dissolving the materials listed above and dispersing for approximately 1 hour using a Nanomizer high pressure impact disperser (produced by Yoshida Kikai Co., Ltd.) so as to disperse the colorant.

The 50% particle diameter on a volume basis (D50) of the colorant fine particle was measured using a dynamic light scattering particle size distribution analyzer (a Nanotrac UPA-EX150 produced by Nikkiso Co., Ltd.), and found to be 0.20 m.

Preparation of Silica Fine Particles 1

10.0 parts of polydimethylsiloxane (viscosity 100 $mm^2/s$) was sprayed onto 100 parts of fumed silica (product name: Aerosil 380S, BET specific surface area: 380 $m^2/g$, number average primary particle diameter: 7 nm, produced by Nippon Aerosil Co., Ltd.), and stirring was continued for 30 minutes. Silica fine particles 1 were then prepared by increasing the temperature to 300° C. while stirring and stirring for a further 2 hours.

Production Example of Toner 1

Preparation of Toner by Emulsification and Aggregation Method

Polymer fine particle 1 dispersion liquid: 500.0 parts
Release agent fine particle dispersion liquid: 50.0 parts
Colorant fine particle dispersion liquid: 80.0 parts
Ion-exchanged water: 160.0 parts
10.0 mass % borax aqueous solution: 19.0 parts
(borax; manufactured by FUJIFILM Wako Chemicals Corp., sodium tetraborate decahydrate $Na_2B_4O_7.10H_2O$)

The above materials were put into a round stainless steel flask and mixed. Subsequently, a homogenizer ULTRA-TURRAX T50 (manufactured by IKA) was used to disperse at 5000 rpm for 10 min. After adding a 1.0% aqueous nitric acid solution and adjusting the pH to 3.0, a stirring blade was used in a water bath for heating and heating to 58° C. was performed while adjusting, as appropriate, the rotation speed so as to stir the mixed solution. The volume average particle diameter of the formed aggregated particles was appropriately confirmed using Coulter Multisizer III, and when the aggregated particles having a size of 6.0 m were formed, the pH was adjusted to 9.0 using a 5% aqueous sodium hydroxide solution. Then, heating to 75° C. was performed while continuing stirring. Then, the aggregated particles were fused by holding at 75° C. for 1 h.

After that, polymer crystallization was promoted by cooling to 50° C. and holding for 3 h. Then, after cooling to 25° C., filtering and solid-liquid separating, washing with ion-exchanged water was performed. After the washing was completed, toner particles 1 having a weight average particle diameter (D4) of 6.07 m were obtained by drying using a vacuum dryer.

External addition was performed with respect to the toner particles 1. Thus, 100.0 parts of toner particles 1 and 1.8 parts of silica fine particles 1 were dry-mixed for 5 min using a Henschel mixer (manufactured by Mitsui Mining Co., Ltd.) to obtain a toner 1. Table 5-1 shows the physical properties of the obtained toner 1.

Production Examples of Toners 2 to 22 and 27 to 30

Preparation of Toners by Emulsion Aggregation Method

Toners 2 to 22 and 27 to 30 were obtained by performing the same operations as in the production example of toner 1, except that the type of the polymer fine particle dispersion liquid and the concentration and the addition amount of borax aqueous solution were changed as shown in Tables 5-1 and 5-2. Tables 5-1 and 5-2 show the physical properties of the toners.

Production Example of Toner 23

Preparation of Toner by Emulsion Aggregation Method

Polymer fine particle 2 dispersion liquid: 350.0 parts
Release agent dispersion liquid: 50.0 parts
Colorant dispersion liquid: 80.0 parts
Ion-exchanged water: 160.0 parts The above materials were put into a round stainless steel flask and mixed. Subsequently, a homogenizer ULTRA-TURRAX T50 (manufactured by IKA) was used to disperse at 5000 rpm for 10 min. After adding a 1.0% aqueous nitric acid solution and adjusting the pH to 3.0, a stirring blade was used in a water bath for heating and heating to 58° C. was performed while adjusting, as appropriate, the rotation speed so as to stir the mixed solution. The volume average particle diameter of the formed aggregated particles was appropriately confirmed using Coulter Multisizer III, and when the aggregated particles having a size of 4.0 m were formed, 19.0 parts of a 10% by mass borax aqueous solution was added. After adding the borax aqueous solution, 150.0 parts of the polymer fine particle 2 dispersion liquid was added, the volume average particle diameter of the aggregated particles was confirmed again, and when the aggregated particles having a size of 6.0 m were formed, the pH was adjusted to 9.0 using a 5% aqueous sodium hydroxide solution. Then, heating to 75° C. was performed while continuing stirring. Then, the aggregated particles were fused by holding at 75° C. for 1 h.

After that, polymer crystallization was promoted by cooling to 50° C. and holding for 3 h. Then, after cooling to 25° C., filtering and solid-liquid separating, washing with ion-exchanged water was performed. After the washing was completed, toner particles 23 having a weight average particle diameter (D4) of 6.21 m were obtained by drying using a vacuum dryer.

External addition same as in the case of toner 1 was performed with respect to the toner particles 23 to obtain a toner 23. Table 5-2 shows the physical properties of the toner 23.

Production Example of Toner 24

A toner 24 was obtained in the same manner as in the production example of toner 1, except that 19.0 parts of a 10.0 mass % borax aqueous solution was replaced with 12.0 parts of a 10.0 mass % boric acid aqueous solution (boric acid; manufactured by FUJIFILM Wako Chemicals Corp., boric acid $H_3BO_3$). Table 5-2 shows the physical properties of the toner 24.

Production Example of Toner 25

Production of Toner by Suspension Polymerization Method

Monomer composition: 100.0 parts (The monomer composition was a mixture of the following behenyl acrylate, methacrylonitrile and styrene in the proportions shown below).

(Behenyl acrylate (polymerizable monomer A): 60.0 parts (28.5 mol %))

(Methacrylonitrile (polymerizable monomer C): 29.0 parts (52.4 mol %))

(Styrene (polymerizable monomer D): 11.0 parts (19.1 mol %))

Pigment Blue 15:3: 6.5 parts
Aluminum di-t-butyl salicylate: 1.0 part
Release agent: 10.0 parts (release agent: manufactured by Nippon Seiro Co., Ltd.: HNP-51, melting point: 74° C.)

Toluene: 100.0 parts
10.0 mass % borax aqueous solution: 36.8 parts

A mixture consisting of the above materials was prepared. The mixture was put into an attritor (manufactured by Nippon Coke Co., Ltd.) and dispersed at 200 rpm for 2 h using zirconia beads having a diameter of 5 mm to obtain a raw material dispersion.

Meanwhile, 735.0 parts of ion-exchanged water and 16.0 parts of trisodium phosphate (12-hydrate) were added to a container equipped with a high-speed stirring device Homomixer (manufactured by PRIMIX Corporation) and a thermometer, and the temperature was raised to 60° C. while stirring at 12,000 rpm. A calcium chloride aqueous solution in which 9.0 parts of calcium chloride (dihydrate) was dissolved in 65.0 parts of ion-exchanged water was added thereto, and stirring was performed at 12,000 rpm for 30 min while maintaining the temperature of 60° C. Then, 10% hydrochloric acid was added to adjust the pH to 6.0, and an aqueous medium including a dispersion stabilizer was obtained.

Subsequently, the raw material dispersion liquid was transferred to a container equipped with a stirring device and a thermometer, and the temperature was raised to 60° C. while stirring at 100 rpm. To this, 8.0 parts of t-butyl peroxypivalate (manufactured by NOF Corporation: Perbutyl PV) was added as a polymerization initiator, and the components were stirred at 100 rpm for 5 min while maintaining 60° C., and then charged into an aqueous medium that was stirred at 12,000 rpm with the high-speed stirring device. Stirring was continued at 12,000 rpm for 20 min with the high-speed stirring device while maintaining the temperature at 60° C. to obtain a granulation liquid.

The granulation liquid was transferred to a reaction vessel equipped with a reflux condenser, a stirrer, a thermometer, and a nitrogen introduction tube, and the temperature was raised to 70° C. while stirring at 150 rpm in a nitrogen atmosphere. The polymerization reaction was carried out at 150 rpm for 10 h while maintaining the temperature at 70° C. Then, the reflux condenser was detached from the reaction vessel, the temperature of the reaction solution was raised to 95° C., and then toluene was removed by stirring at 150 rpm for 5 h while maintaining the temperature at 95° C. to obtain a toner particle dispersion liquid.

The obtained toner particle dispersion liquid was cooled to 20° C. while stirring at 150 rpm, and then dilute hydrochloric acid was added until the pH reached 1.5 while maintaining the stirring to dissolve the dispersion stabilizer. The solid fraction was separated by filtration, thoroughly washed with ion-exchanged water, and then vacuum dried at 40° C. for 24 h to obtain toner particles 25 including the side-chain crystalline polymer B-16 of the monomer composition.

Further, a side-chain crystalline polymer B-16' was obtained in the same manner as in the method for producing the toner particles 25, except that Pigment Blue 15:3, aluminum di-t-butyl salicylate and the release agent were not used. The weight average molecular weight (Mw) of the polymer B-16' was 56,800, the acid value was 0.0 mg KOH/g, and the melting point was 55° C. According to NMR analysis results, the polymer A1 included 28.5 mol % of the monomer unit derived from behenyl acrylate, 52.4 mol % of the monomer unit derived from methyl methacrylate, and 19.1 mol % of the monomer unit derived from styrene. Since the polymer B-16 and the polymer B-16' were produced in the same manner, it was determined that they have the same physical properties.

External addition same as in the case of toner 1 was performed with respect to the toner particles 25 to obtain a toner 25. Table 5-2 shows the physical properties of the toner 25.

Production Example of Toner 26

Preparation of Toner by Pulverization Method

Side-chain crystalline polymer B2: 100.0 parts

C. I. Pigment Blue 15:3: 6.5 parts

Release agent: 12.0 parts (manufactured by Nippon Seiro Co., Ltd., HNP-51, melting point: 74° C.)

Charge control agent (T-77: manufactured by Hodogaya Chemical Co., Ltd.): 2.0 parts Boric acid powder (manufactured by FUJIFILM Wako Chemicals Corp.): 1.5 parts The above materials were premixed with an FM mixer (manufactured by Nippon Coke Industries Co., Ltd.) and then melt-kneaded with a twin-screw kneading extruder (PCM-30 type manufactured by Ikegai Iron Works Co., Ltd.).

The obtained kneaded product was cooled, coarsely pulverized with a hammer mill, and then pulverized with a mechanical crusher (T-250 manufactured by Turbo Industries Co., Ltd.), and the obtained finely pulverized powder was classified with a multi-division classifier using the Coanda effect to obtain toner particles 26 having a weight average particle diameter (D4) of 7.00 m.

External addition same as in the case of toner 1 was performed with respect to the toner particles 26 to obtain a toner 26. Table 5-2 shows the physical properties of the toner 26.

Example 1

The following evaluation was carried out for toner 1.

<1> Evaluation of Low-Temperature Fixability

A process cartridge filled with the toner was allowed to stand for 48 h in a normal temperature and humidity (N/N) environment (23° C., 60% RH). Using LBP-7700C modified to enable operation even when the fixing device is removed, an unfixed image of an image pattern in which a 10 mm×10 mm square image was evenly arranged at 9 points on the entire transfer paper was output. The toner laid-on level on the transfer paper was 0.80 mg/cm$^2$, and the fixing start temperature was evaluated. As the transfer paper, Fox River Bond (90 g/m$^2$) was used.

The fixing device of LBP-7700C was removed to the outside, and an external fixing device was used to enable operation outside the laser beam printer. In the external fixing device, the fixing temperature was raised from 100° C. in increments of 10° C., and fixing was performed under the process speed condition of 240 mm/sec.

The fixed image was rubbed with Sylbon paper [Lens Cleaning Paper "dasper (R)" (Ozu Paper Co. Ltd)] under a load of 50 g/cm$^2$. Then, the temperature at which the concentration decrease rate from before to after rubbing was not more than 20% was set as the fixing start temperature, and the low-temperature fixability was evaluated according to the following criteria. The evaluation results are shown in Table 6.

Evaluation Criteria

A: Fixing start temperature is 100° C.

B: Fixing start temperature is 110° C.

C: Fixing start temperature is 120° C.

D: Fixing start temperature is at least 130° C.

<2> Evaluation of Heat-Resistant Storage Stability

A total of 10 g of toner was weighed in a 50 mL plastic cup and allowed to stand in a thermostat at 52.5° C. for 5 days. The toner after being allowed to stand was visually observed, and the heat-resistant storage stability (blocking property) was evaluated according to the following criteria. C or higher was determined to be favorable. The results are shown in Table 6.

A: The toner comes loose immediately after the cup is turned

B: There is a lump, but as the cup is turned, the lump is reduced in size and comes loose C: Even if the cup is turned to loosen the toner, a lump remains D: There is a large lump, and it does not come loose even if the cup is turned <3> Durability Durability was evaluated using a commercial Canon printer LBP9200C. The LBP9200C employs one-component contact development, and the amount of toner on the developer carrying member is regulated by a toner regulating member. An evaluation cartridge was prepared by removing the toner contained in the commercial cartridge, cleaning the inside with an air blow, and then filling the cartridge with 260 g of the toner to be evaluated. The evaluation was carried out by mounting the cartridge on the cyan station and mounting dummy cartridges on the other stations.

Using Fox River Bond (90 g/m$^2$) in a 23° C. and 50% RH environment, 20,000 images with a print percentage of 1% were printed. After that, a halftone image in which the toner laid-on level was 0.3 mg/cm$^2$ was output, and the presence or absence of vertical streaks, which are so-called development streaks, caused by toner fusion to the regulating member was checked on the developer carrying member and the halftone image. The evaluation criteria were as follows. C or higher was determined to be favorable. The results are shown in Table 6.

A: No streaks on the developer carrying member

B: Streaks can be seen on the developer carrying member, but not on the halftone image C: A slight streak can be seen on the halftone image D: There are clear streaks on the halftone image

Examples 2-26

The same evaluation as in Example 1 was performed on the toners 2 to 26. The results are shown in Table 6.

Comparative Examples 1 to 4

The same evaluation as in Example 1 was performed on the toners 26 to 30. The results are shown in Table 6.

TABLE 1

| | Polymer B | | | | | |
|---|---|---|---|---|---|---|
| | First polymerizable monomer (polymerizable monomer A) | | Second polymerizable monomer (polymerizable monomer C) | | Another polymerizable monomer (polymerizable monomer D) | |
| | Type | Parts by mass | Type | Parts by mass | Type | Parts by mass |
| B-1 | Behenyl acrylate | 67.0 | Methacrylonitrile | 22.0 | Styrene | 11.0 |
| B-2 | Behenyl acrylate | 60.0 | Methyl methacrylate | 29.0 | Styrene | 11.0 |
| B-3 | Behenyl acrylate | 40.0 | Methacrylonitrile | 40.0 | Styrene | 20.0 |
| B-4 | Behenyl acrylate | 89.0 | Methacrylonitrile | 11.0 | — | — |
| B-5 | Behenyl acrylate | 90.0 | Methyl methacrylate | 10.0 | — | — |
| B-6 | Behenyl acrylate | 25.0 | Vinyl acetate | 75.0 | — | — |
| B-7 | Behenyl acrylate | 95.0 | Methyl methacrylate | 5.0 | — | — |
| B-8 | Behenyl acrylate | 18.0 | Vinyl acetate | 82.0 | — | — |
| B-9 | Behenyl acrylate | 67.0 | Acrylonitrile | 22.0 | Styrene | 11.0 |
| B-10 | Behenyl acrylate | 65.0 | Acrylamide | 25.0 | Styrene | 10.0 |
| B-11 | Behenyl acrylate | 60.0 | Methyl acrylate | 30.0 | Styrene | 10.0 |
| B-12 | Stearyl acrylate | 67.0 | Methacrylonitrile | 22.0 | Styrene | 11.0 |
| B-13 | Octacosyl acrylate | 67.0 | Methacrylonitrile | 22.0 | Styrene | 11.0 |
| B-14 | Myricyl acrylate | 67.0 | Methacrylonitrile | 22.0 | Styrene | 11.0 |
| B-15 | Hexadecyl acrylate | 67.0 | Methacrylonitrile | 22.0 | Styrene | 11.0 |

TABLE 2

| | Polymer B | | | | | | | |
|---|---|---|---|---|---|---|---|---|
| | First polymerizable monomer (polymerizable monomer A) | | Second polymerizable monomer (polymerizable monomer C) | | Another polymerizable monomer (polymerizable monomer D) | | SP21-SP11 Monomer | SP22-SP12 Polymerizable |
| | Type | mol % | Type | mol % | Type | mol % | unit | monomer |
| B-1 | Behenyl acrylate | 28.9 | Methacrylonitrile | 53.8 | Styrene | 17.3 | 7.71 | 4.28 |
| B-2 | Behenyl acrylate | 28.5 | Methyl methacrylate | 52.4 | Styrene | 19.1 | 2.06 | 0.58 |
| B-3 | Behenyl acrylate | 11.8 | Methacrylonitrile | 66.7 | Styrene | 21.5 | 7.71 | 4.28 |
| B-4 | Behenyl acrylate | 58.8 | Methacrylonitrile | 41.2 | — | — | 7.71 | 4.28 |
| B-5 | Behenyl acrylate | 70.3 | Methyl methacrylate | 29.7 | — | — | 2.06 | 0.58 |
| B-6 | Behenyl acrylate | 7.0 | Vinyl acetate | 93.0 | — | — | 3.35 | 0.62 |
| B-7 | Behenyl acrylate | 83.3 | Methyl methacrylate | 16.7 | — | — | 2.06 | 0.58 |
| B-8 | Behenyl acrylate | 4.7 | Vinyl acetate | 95.3 | — | — | 3.35 | 0.62 |
| B-9 | Behenyl acrylate | 25.3 | Acrylonitrile | 59.5 | Styrene | 15.2 | 11.18 | 5.06 |
| B-10 | Behenyl acrylate | 27.6 | Acrylamide | 56.9 | Styrene | 15.5 | 21.00 | 11.44 |
| B-11 | Behenyl acrylate | 26.2 | Methyl acrylate | 57.9 | Styrene | 15.9 | 3.35 | 0.62 |
| B-12 | Stearyl acrylate | 32.3 | Methacrylonitrile | 51.2 | Styrene | 16.5 | 7.57 | 4.26 |
| B-13 | Octacosyl acrylate | 25.0 | Methacrylonitrile | 56.8 | Styrene | 18.3 | 7.86 | 4.32 |
| B-14 | Myricyl acrylate | 23.9 | Methacrylonitrile | 57.6 | Styrene | 18.5 | 7.88 | 4.32 |
| B-15 | Hexadecyl acrylate | 34.3 | Methacrylonitrile | 49.7 | Styrene | 16.0 | 7.49 | 4.24 |

TABLE 3

| | | SP value of polymerizable monomer $(J/cm^3)^{0.5}$ | SP value of unit $(J/cm^3)^{0.5}$ |
|---|---|---|---|
| First polymerizable monomer (polymerizable monomer A) | Behenyl acrylate | 17.69 | 18.25 |
| | Stearyl acrylate | 17.71 | 18.39 |
| | Myricyl acrylate | 17.65 | 18.08 |
| | Octacosyl acrylate | 17.65 | 18.10 |
| | Hexadecyl acrylate | 17.73 | 18.47 |
| Second polymerizable monomer (polymerizable monomer C) | Acrylonitrile | 22.75 | 29.43 |
| | Methacrylonitrile | 21.97 | 25.96 |
| | Vinyl acetate | 18.31 | 21.60 |
| | Methyl acrylate | 18.31 | 21.60 |
| | Methyl methacrylate | 18.27 | 20.31 |
| | Acrylamide | 29.13 | 39.25 |
| Another polymerizable monomer (polymerizable monomer D) | Styrene | 17.94 | 20.11 |

TABLE 4

| | Side-chain crystalline polymer B | Parts | Amorphous resin other than the side-chain crystalline polymer B | Parts |
|---|---|---|---|---|
| Polymer fine particle 1 dispersion liquid | B-1 | 300 | — | — |
| Polymer fine particle 2 dispersion liquid | B-2 | 300 | — | — |
| Polymer fine particle 3 dispersion liquid | B-3 | 300 | — | — |
| Polymer fine particle 4 dispersion liquid | B-4 | 300 | — | — |
| Polymer fine particle 5 dispersion liquid | B-5 | 300 | — | — |
| Polymer fine particle 6 | B-6 | 300 | — | — |

TABLE 4-continued

| | Side-chain crystalline polymer B | Parts | Amorphous resin other than the side-chain crystalline polymer B | Parts |
|---|---|---|---|---|
| dispersion liquid | | | | |
| Polymer fine particle 7 dispersion liquid | B-7 | 300 | — | — |
| Polymer fine particle 8 dispersion liquid | B-8 | 300 | — | — |
| Polymer fine particle 9 dispersion liquid | B-9 | 300 | — | — |
| Polymer fine particle 10 dispersion liquid | B-10 | 300 | — | — |
| Polymer fine particle 11 dispersion liquid | B-11 | 300 | — | — |
| Polymer fine particle 12 dispersion liquid | B-12 | 300 | — | — |
| Polymer fine particle 13 dispersion liquid | B-13 | 300 | — | — |
| Polymer fine particle 14 dispersion liquid | B-14 | 300 | — | — |
| Polymer fine particle 15 dispersion liquid | B-2 | 75 | Amorphous resin 1 | 25 |
| Polymer fine particle 16 dispersion liquid | B-2 | 50 | Amorphous resin 1 | 50 |
| Polymer fine particle 17 dispersion liquid | B-2 | 40 | Amorphous resin 1 | 60 |
| Polymer fine particle 18 dispersion liquid | B-15 | 300 | — | — |

TABLE 5-1

| Toner No. | Toner production method | Polymer fine particle dispersion liquid | Number of added parts of boric acid component | | Boric acid in toner, (% by mass) | DSC peak derived from side-chain crystalline resin: Melting point (° C.) | DSC peak derived from side-chain crystalline resin: Half-value width | Molecular weight Mw | Weight average particle dimeter (D4) |
|---|---|---|---|---|---|---|---|---|---|
| 1 | Emulsion aggregation | Polymer fine particle 1 dispersion liquid | 10.0 mass % Borax aqueous solution | 19.0 | 1.0 | 63 | 1.68 | 68900 | 6.07 |
| 2 | Emulsion aggregation | Polymer fine particle 2 dispersion liquid | 10.0 mass % Borax aqueous solution | 19.0 | 1.0 | 55 | 1.78 | 69400 | 6.21 |
| 3 | Emulsion aggregation | Polymer fine particle 3 dispersion liquid | 10.0 mass % Borax aqueous solution | 19.0 | 1.0 | 57 | 1.69 | 66900 | 6.22 |
| 4 | Emulsion aggregation | Polymer fine particle 4 dispersion liquid | 10.0 mass % Borax aqueous solution | 19.0 | 1.0 | 63 | 1.67 | 67400 | 6.21 |
| 5 | Emulsion aggregation | Polymer fine particle 5 dispersion liquid | 10.0 mass % Borax aqueous solution | 19.0 | 1.0 | 63 | 1.69 | 68400 | 6.15 |
| 6 | Emulsion aggregation | Polymer fine particle 6 dispersion liquid | 10.0 mass % Borax aqueous solution | 19.0 | 1.0 | 63 | 1.74 | 69400 | 6.09 |
| 7 | Emulsion aggregation | Polymer fine particle 7 dispersion liquid | 10.0 mass % Borax aqueous solution | 19.0 | 1.0 | 63 | 1.77 | 68600 | 6.21 |
| 8 | Emulsion aggregation | Polymer fine particle 8 dispersion liquid | 10.0 mass % Borax aqueous solution | 19.0 | 1.0 | 61 | 1.75 | 66400 | 6.32 |
| 9 | Emulsion aggregation | Polymer fine particle 9 dispersion liquid | 10.0 mass % Borax aqueous solution | 19.0 | 1.0 | 63 | 1.71 | 68300 | 6.21 |
| 10 | Emulsion aggregation | Polymer fine particle 10 dispersion liquid | 10.0 mass % Borax aqueous solution | 19.0 | 1.0 | 60 | 1.81 | 69500 | 6.54 |
| 11 | Emulsion aggregation | Polymer fine particle 11 dispersion liquid | 10.0 mass % Borax aqueous solution | 19.0 | 1.0 | 55 | 1.75 | 67500 | 6.32 |
| 12 | Emulsion aggregation | Polymer fine particle 12 dispersion liquid | 10.0 mass % Borax aqueous solution | 19.0 | 1.0 | 55 | 1.88 | 68200 | 6.33 |
| 13 | Emulsion aggregation | Polymer fine particle 13 dispersion liquid | 10.0 mass % Borax aqueous solution | 19.0 | 1.0 | 79 | 1.92 | 66200 | 6.21 |
| 14 | Emulsion aggregation | Polymer fine particle 14 dispersion liquid | 10.0 mass % Borax aqueous solution | 19.0 | 1.0 | 77 | 1.97 | 64500 | 6.22 |
| 15 | Emulsion aggregation | Polymer fine particle 15 dispersion liquid | 10.0 mass % Borax aqueous solution | 19.0 | 1.0 | 63 | 1.82 | 80900 | 6.32 |

In the table, the unit of the half-value width is ° C., and the unit of the weight average particle diameter (D4) is μm.

TABLE 5-2

| Toner No. | Toner production method | Polymer fine particle dispersion liquid | Number of added parts of boric acid component | | Boric acid in toner, (% by mass) | DSC peak derived from side-chain crystalline resin: Melting point (° C.) | DSC peak derived from side-chain crystalline resin: Half-value width | Molecular weight Mw | Weight average particle dimeter (D4) |
|---|---|---|---|---|---|---|---|---|---|
| 16 | Emulsion aggregation | Polymer fine particle 16 dispersion liquid | 10.0 mass % Borax aqueous solution | 19.0 | 1.0 | 63 | 1.82 | 79900 | 6.41 |
| 17 | Emulsion aggregation | Polymer fine particle 17 dispersion liquid | 10.0 mass % Borax aqueous solution | 19.0 | 1.0 | 63 | 1.82 | 78900 | 6.32 |
| 18 | Emulsion aggregation | Polymer fine particle 2 dispersion liquid | 10.0 mass % Borax aqueous solution | 0.90 | 0.05 | 53 | 2.04 | 69000 | 6.26 |
| 19 | Emulsion aggregation | Polymer fine particle 2 dispersion liquid | 10.0 mass % Borax aqueous solution | 1.8 | 0.1 | 54 | 1.91 | 69200 | 6.28 |
| 20 | Emulsion aggregation | Polymer fine particle 2 dispersion liquid | 10.0 mass % Borax aqueous solution | 96.0 | 5.0 | 55 | 1.78 | 70400 | 6.32 |
| 21 | Emulsion aggregation | Polymer fine particle 2 dispersion liquid | 30.0 mass % Borax aqueous solution | 68.0 | 10.1 | 55 | 1.74 | 71400 | 6.32 |
| 22 | Emulsion aggregation | Polymer fine particle 2 dispersion liquid | 30.0 mass % Borax aqueous solution | 83.0 | 12.0 | 55 | 1.68 | 72400 | 6.45 |
| 23 | Emulsion aggregation | Polymer fine particle 2 dispersion liquid | 10.0 mass % Borax aqueous solution | 19.0 | 1.0 | 54 | 1.9 | 69400 | 6.21 |
| 24 | Emulsion aggregation | Polymer fine particle 2 dispersion liquid | 10.0 mass % Boric acid aqueous solution | 12.0 | 1.0 | 55 | 1.78 | 69400 | 6.21 |
| 25 | Suspension method | — | 10.0 mass % Borax aqueous solution | 19.0 | 1.0 | 55 | 1.82 | 56800 | 6.41 |
| 26 | Pulverization method | — | Boric acid powder | 1.5 | 1.0 | 55 | 1.84 | 57000 | 7.00 |
| 27 | Emulsion aggregation | Polymer fine particle 2 dispersion liquid | — | — | — | 52 | 2.15 | 68900 | 6.43 |
| 28 | Emulsion aggregation | Polymer fine particle 18 dispersion liquid | 10.0 mass % Borax aqueous solution | 19.0 | 1.0 | 47 | 1.85 | 64500 | 6.52 |
| 29 | Emulsion aggregation | Polymer fine particle 20 dispersion liquid | 10.0 mass % Borax aqueous solution | 19.0 | 1.0 | — | — | 35000 | 6.62 |
| 30 | Emulsion aggregation | Polymer fine particle 19 dispersion liquid | 10.0 mass % Borax aqueous solution | 19.0 | 1.0 | — | — | 23000 | 6.56 |

In the table, the unit of the half-value width is ° C., and the unit of the weight average particle diameter (D4) is μm.

TABLE 6

| | | | Low-temperature fixability | Storage stability | Durability |
|---|---|---|---|---|---|
| Example | 1 | Toner 1 | A | A | A |
| | 2 | Toner 2 | A | B | A |
| | 3 | Toner 3 | C | B | A |
| | 4 | Toner 4 | A | A | B |
| | 5 | Toner 5 | A | A | B |
| | 6 | Toner 6 | C | A | A |
| | 7 | Toner 7 | A | A | C |
| | 8 | Toner 8 | C | A | A |
| | 9 | Toner 9 | A | A | A |
| | 10 | Toner 10 | B | A | A |
| | 11 | Toner 11 | A | B | A |
| | 12 | Toner 12 | A | B | A |
| | 13 | Toner 13 | C | A | A |
| | 14 | Toner 14 | C | A | A |
| | 15 | Toner 15 | A | A | A |
| | 16 | Toner 16 | B | A | A |
| | 17 | Toner 17 | C | A | A |
| | 18 | Toner 18 | A | C | A |
| | 19 | Toner 19 | A | B | A |
| | 20 | Toner 20 | A | A | A |
| | 21 | Toner 21 | B | A | A |
| | 22 | Toner 22 | C | A | A |
| | 23 | Toner 23 | A | B | A |
| | 24 | Toner 24 | A | B | A |
| | 24 | Toner 25 | A | B | A |
| | 25 | Toner 26 | A | B | A |

TABLE 6-continued

| | | | Low-temperature fixability | Storage stability | Durability |
|---|---|---|---|---|---|
| Comparative Example | 1 | Toner 27 | A | D | A |
| | 2 | Toner 28 | A | D | A |
| | 3 | Toner 29 | D | A | A |
| | 4 | Toner 30 | D | A | A |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-134035, filed Aug. 19, 2021, which is hereby incorporated by reference herein in its entirety.

What is claimed is:

1. A toner comprising a toner particle comprising a binder resin and boric acid;

the binder resin having a side-chain crystalline polymer B comprising a monomer unit A made of at least one polymerizable monomer A selected from the group consisting of (meth)acrylic acid esters having a linear alkyl group having 18 to 36 carbon atoms, wherein the toner comprises 0.8 to 6.0% by mass boric acid, and a half-value width of a peak corresponding to the side-chain crystalline polymer B which is measured by differential scanning calorimetry of the toner is not more than 1.85° C.

2. The toner according to claim 1, wherein an amount of the side-chain crystalline polymer B in the binder resin is at least 50.0% by mass.

3. The toner according to claim 1, wherein the side-chain crystalline polymer B comprises monomer unit A and a monomer unit C made of a polymerizable monomer C that differs from polymerizable monomer A.

4. The toner according to claim 3, wherein $2.00 \leq (SP_{21} - SP_{11}) \leq 25.00$ and $0.50 \leq (SP_{22} - SP_{12}) \leq 15.00$ where $SP_{11}$ $(J/cm^3)^{0.5}$ is an SP value of monomer unit A and $SP_{21}$ $(J/cm^3)^{0.5}$ is an SP value of monomer unit C in the side-chain crystalline polymer B, and $SP_{12}$ $(J/cm^3)^{0.5}$ is an SP value of polymerizable monomer A and $SP_{22}$ $(J/cm^3)^{0.5}$ is an SP value of polymerizable monomer C.

5. The toner according to claim 3, wherein the polymerizable monomer C is at least one member selected from the group consisting of acrylonitrile, methacrylonitrile and methyl methacrylate.

6. The toner according to claim 3, wherein a content ratio of the monomer unit A in the side-chain crystalline polymer B is 35.0 to 80.0% by mass, and a content ratio of the monomer unit C in the side-chain crystalline polymer B is 15.0 to 55.0% by mass.

7. The toner according to claim 3, wherein the side-chain crystalline polymer B has a monomer unit D made of a polymerizable monomer D that differs from polymerizable monomer A and polymerizable monomer C, and polymerizable monomer D is styrene.

8. A method for producing a toner comprising a toner particle comprising a binder resin and boric acid, the method comprising the steps (1) to (3):

(1) a dispersion step of preparing a dispersion liquid of resin fine particles comprising the binder resin comprising at least a side-chain crystalline polymer B having a monomer unit A derived from at least one polymerizable monomer A selected from the group consisting of (meth) acrylic acid esters having a linear alkyl group having 18 to 36 carbon atoms;

(2) an aggregation step of mixing and aggregating at least the dispersion liquid of the resin fine particles to form aggregates; and (3) a fusion step of heating and fusing the aggregates, wherein boric acid is present in the dispersion liquid in at least one of steps (1) to (3), the toner comprises 0.8 to 6.0% by mass boric acid, and a half-value width of a peak corresponding to the side-chain crystalline polymer B which is measured by differential scanning calorimetry of the toner is not more than 1.85° C.

9. A method for producing a toner comprising a toner particle comprising a binder resin and boric acid, the method comprising the steps (1) to (3):

(1) a dispersion step of preparing a dispersion liquid of resin fine particles comprising the binder resin comprising at least a side-chain crystalline polymer B having a monomer unit A derived from at least one polymerizable monomer A selected from the group consisting of (meth)acrylic acid esters having a linear alkyl group having 18 to 36 carbon atoms;

(2) an aggregation step of mixing and aggregating at least the dispersion liquid of the resin fine particles to form aggregates; and (3) a fusion step of heating and fusing the aggregates, wherein borax is added to the dispersion liquid in at least one of steps (1) to (3), the toner comprises 0.8 to 6.0% by mass boric acid, and a half-value width of a peak corresponding to the side-chain crystalline polymer B which is measured by differential scanning calorimetry of the toner is not more than 1.85° C.

10. The method for producing a toner according to claim 8, comprising a step of adding an aqueous borax solution to the dispersion liquid and mixing to make the dispersion liquid acidic when the dispersion liquid is mixed in the step (2).

11. The method for producing a toner according to claim 9, comprising a step of adding an aqueous borax solution to the dispersion liquid and mixing to make the dispersion liquid acidic when the dispersion liquid is mixed in the step (2).

* * * * *